US008841790B1

(12) United States Patent
Burger et al.

(10) Patent No.: US 8,841,790 B1
(45) Date of Patent: *Sep. 23, 2014

(54) HYDRODYNAMIC ARRAY

(71) Applicant: Blue Energy Canada Inc., Seattle, WA (US)

(72) Inventors: Martin James Burger, Columbia Valley (CA); Norman William Reid, Calgary (CA)

(73) Assignee: Blue Energy Canada Inc., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/736,837

(22) Filed: Jan. 8, 2013

Related U.S. Application Data

(63) Continuation of application No. 12/552,961, filed on Sep. 2, 2009, now Pat. No. 8,400,006.

(60) Provisional application No. 61/169,670, filed on Apr. 15, 2009.

(51) Int. Cl.
*F03B 13/10* (2006.01)
*F03B 13/12* (2006.01)
*H02P 9/04* (2006.01)

(52) U.S. Cl.
USPC .......................................................... 290/43

(58) Field of Classification Search
USPC ............... 290/53, 54, 43; 415/3.1, 210.1; 406/191; 14/13, 73, 74.5, 77.1, 74, 24, 14/25, 26, 2.5; 404/1
See application file for complete search history.

(56) References Cited

U.S. PATENT DOCUMENTS

| 4,669,143 | A  | * | 6/1987  | Schambeck ............... 14/74.5 |
| 5,924,152 | A  | * | 7/1999  | Maier ...................... 14/2.4 |
| 6,817,444 | B1 | * | 11/2004 | Shinas ..................... 182/150 |
| 7,090,586 | B1 | * | 8/2006  | Everett et al. .............. 472/92 |
| 7,471,009 | B2 | * | 12/2008 | Davis et al. ................. 290/54 |
| 2004/0055249 | A1 | * | 3/2004  | Kennedy .................. 52/794.1 |
| 2009/0282626 | A1 | * | 11/2009 | Powers ..................... 14/77.1 |
| 2012/0011665 | A1 | * | 1/2012  | Porter et al. ................. 14/75 |

FOREIGN PATENT DOCUMENTS

| CN | 1836101 A       |   | 9/2006  |           |
| FR | 2 865 226 A1    |   | 7/2005  |           |
| GB | 2 298 004 A     |   | 8/1996  |           |
| JP | 04-277205 A     |   | 10/1992 |           |
| JP | 04277205 A      | * | 10/1992 | E01D 7/00 |
| WO | 03/025385 A2    |   | 3/2003  |           |
| WO | 2004/048774 A1  |   | 6/2004  |           |

(Continued)

OTHER PUBLICATIONS

Davis, B.V., "A Major Source of Energy From the Worlds Oceans," Intersociety Energy Conversion Engineering Conference (IECEC-97), Honolulu, Jul. 27-Aug. 1, 1997, pp. 1-8.

(Continued)

*Primary Examiner* — Julio Gonzalez
(74) *Attorney, Agent, or Firm* — Christensen O'Connor Johnson Kindness PLLC

(57) ABSTRACT

There are a large number of sites in the world's oceans and rivers that can provide a significant, viable, and cost effective source of renewable energy. Many are strategically located close to populated areas where these sites can be used to harness energy using ecologically benign hydrodynamic technology. A hydrodynamic array comprises multiple hydrodynamic elements for producing electricity by the motion of ocean tides or river currents and forces acting on the hydrodynamic array, which is immersed in ocean tides or river currents and which is in motion relative to the ocean tides or river currents.

19 Claims, 23 Drawing Sheets

(56) References Cited

FOREIGN PATENT DOCUMENTS

| WO | 2005/017349 | A1 | 2/2005 |
|---|---|---|---|
| WO | 2006/108264 | A1 | 10/2006 |
| WO | 2008/063008 | A1 | 5/2008 |
| WO | 2010/032026 | A2 | 3/2010 |
| WO | 2011/005100 | A1 | 1/2011 |
| WO | 2011/025387 | A1 | 3/2011 |

OTHER PUBLICATIONS

International Search Report mailed Sep. 1, 2010, issued in corresponding PCT/CA2010/000813, filed Jun. 2, 2010, 3 pages.

International Search Report mailed Jan. 11, 2012, issued in corresponding PCT/CA2011/050670, filed Oct. 26, 2011, 3 pages.

Notice of Reasons for Rejection mailed Apr. 1, 2014, issued in related Japanese Application No. 2012-527160, filed Jun. 2, 2010, 10 pages.

Office Action mailed Apr. 11, 2014, issued in related Russian Application No. 2012112818, filed Jun. 2, 2010, 6 pages.

First Office Action and Search Report mailed May 16, 2014, issued in related Chinese Application No. 201080042824.5, filed Jun. 2, 2010, 13 pages.

Office Action mailed May 22, 2014, issued in related Chilean Application No. 563-2012, filed Jun. 2, 2010, 12 pages.

* cited by examiner

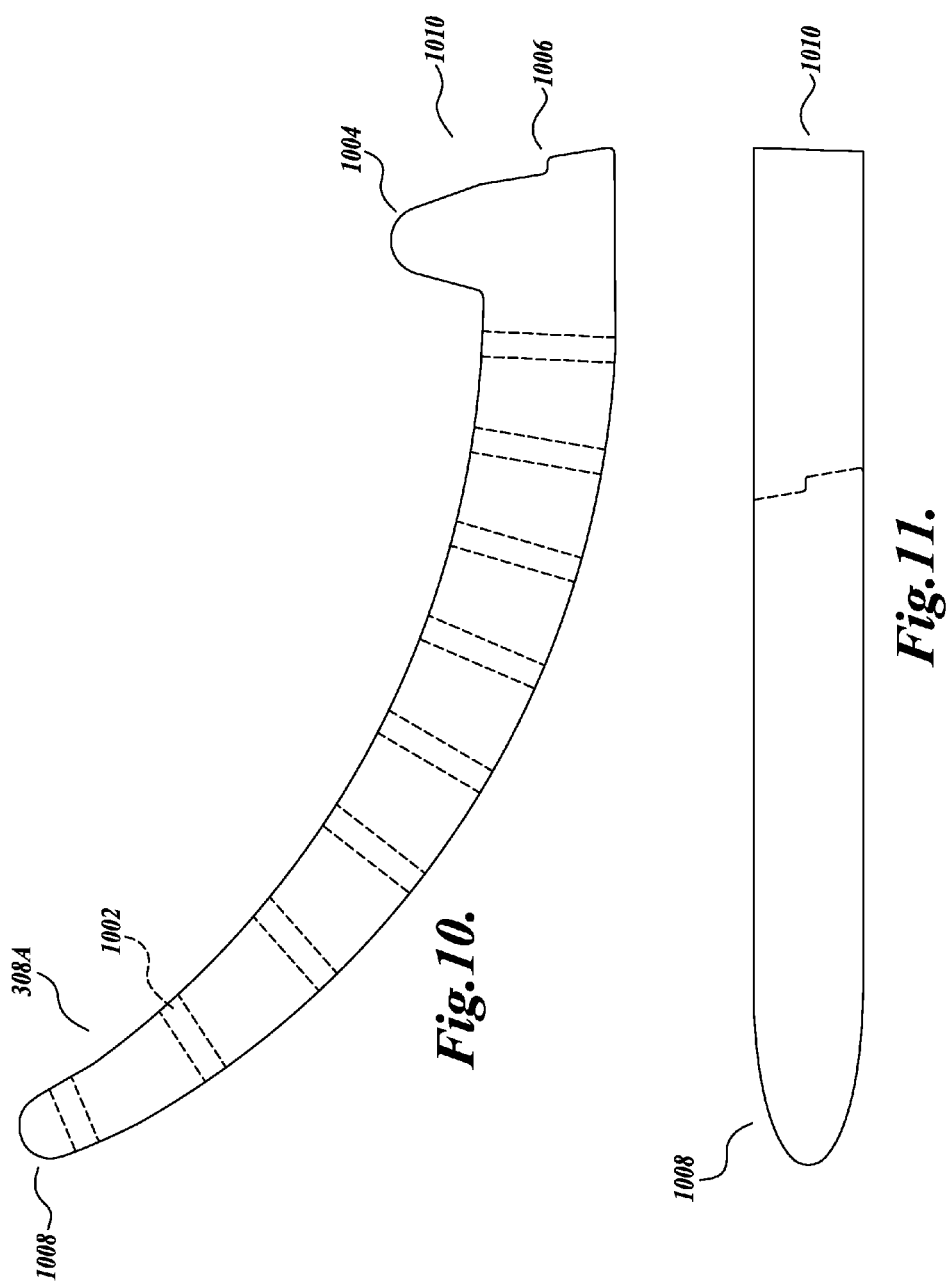

HYDRODYNAMIC ARRAY

CROSS-REFERENCE TO RELATED APPLICATION

This application is a continuation of U.S. application Ser. No. 12/552,961, filed Sep. 2, 2009, which claims the benefit of U.S. Provisional Application No. 61/169,670, filed Apr. 15, 2009, all of which is incorporated herein by reference.

BACKGROUND

The earth is a watery world with 71 percent of its surface covered by oceans and even its landmasses cut by rivers. The periodic rise and fall of all ocean waters is called tide, which results from gravitational attraction among the moon, sun, and earth. Although such gravitational attraction causes the vertical rise and fall of water, of particular interest to the renewable energy industry are the various horizontal or lateral movements commonly known as tidal currents or tidal streams from which great amounts of electricity can be produced. The advent of renewable energy, such as tidal energy, could be of vital importance to the future of civilization because reliance on fossil fuels cannot be sustained for another century. A transition toward renewable energy technologies would usher in a new age to supplant the age of fossil fuels, and address the problems of diminished oil reserves, destructive environmental impacts, and intractable religious conflicts.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the present subject matter includes a system for producing electricity hydrodynamically. The system comprises a viaduct through which vehicles traverse. The system further comprises a hydrodynamic array configured to support the viaduct and further configured to generate electricity from the motion of ocean tides or river currents and forces acting on the hydrodynamic array, which is immersed in the ocean tides or river currents and which is in motion relative to the ocean tides or river currents.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 10 is a side view of an exemplary upper fin;

FIG. 11 is a plan view of an exemplary upper fin;

DETAILED DESCRIPTION

Various embodiments of the present subject matter are directed to a hydrodynamic array configured to produce electricity not only from ocean tides but also river currents. Suitably situated on top of the hydrodynamic array is a viaduct configured both for automobile transportation and also the construction, assembly, disassembly, installation, removal, and maintenance of pieces of the hydrodynamic array including its structural, mechanical, electrical, and electronic support equipment. Each element of the hydrodynamic array can be interconnected with another element and so on to form a porous hydrodynamic array going across a strait, passage, estuary, canal, flume, or river.

Figure 1:
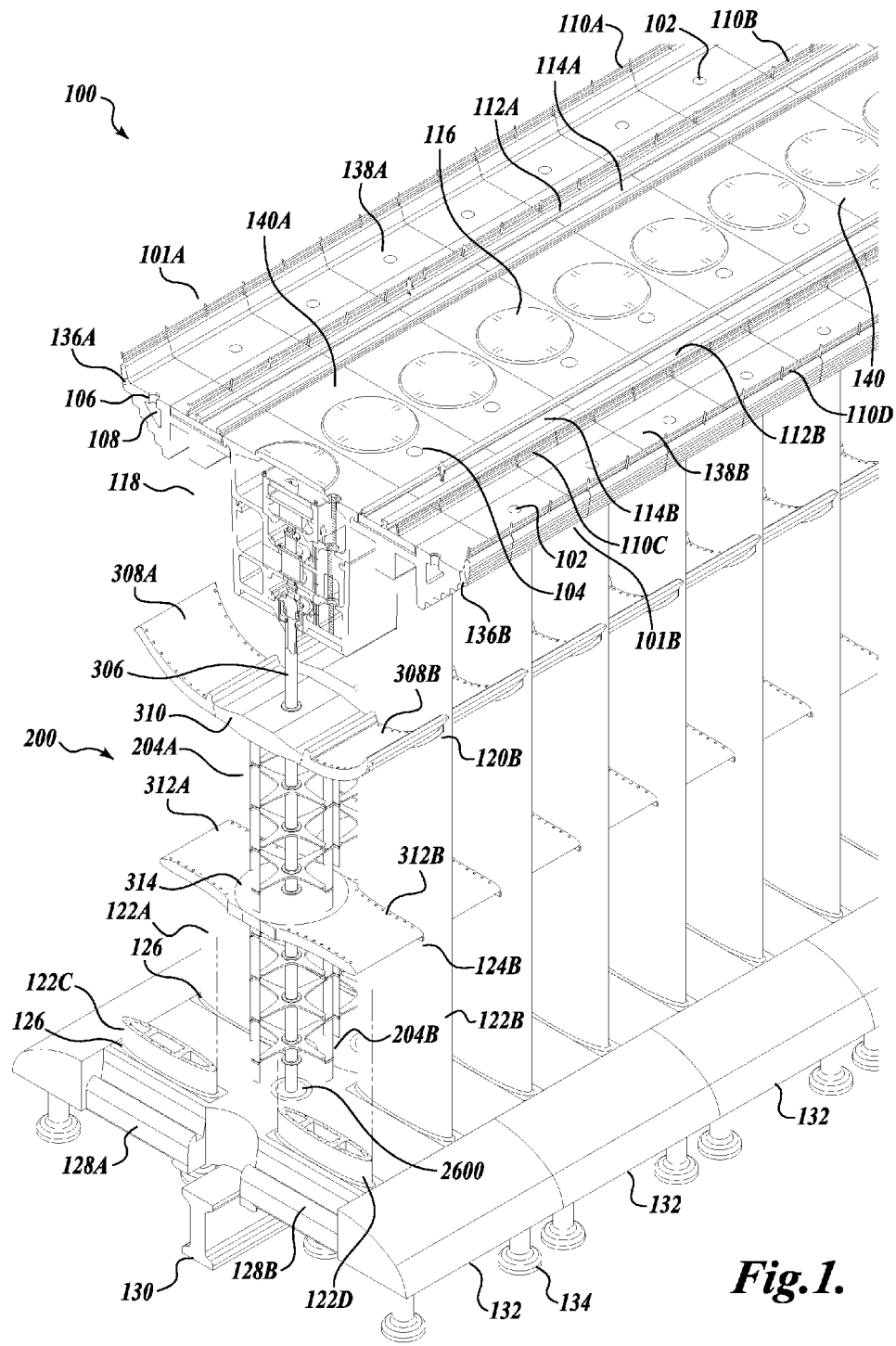
FIG. 1 is a cross-sectional, assembled, isometric view of an exemplary viaduct on top of an exemplary hydrodynamic array.

FIG. 1 illustrates a viaduct 100, which comprises long elevated roadways 138a, 138b separated by a median strip 140. The viaduct 100 consists of a series of short roadway spans interconnected with median spans, and supported by columns of a hydrodynamic array 200. More specifically, the viaduct 100 is an array of viaduct elements. Each viaduct element is a set of members including two corresponding roadway spans (such as spans 101a, 101b). Each corresponding roadway span 101a, 101b is interconnected with a median span (such as a median span 140a). Each viaduct element is interconnected with other viaduct elements via latches to form a viaduct 100 (which is discussed hereinbelow). For clarity purposes the following discussion focuses on the set of roadway spans 101a, 101b. Because the viaduct 100 is formed from multiple sets of roadway spans, one skilled in the art would appreciate that the discussion is pertinent to other sets of roadway spans forming the viaduct 100.

The hydrodynamic array 200 is an array of hydrodynamic elements. Each hydrodynamic element is a set of members and includes four columns (such as columns 122a, 122b, 122c, and 122c) supporting a viaduct element. The four columns 122a, 122b, 122c, and 122c rest on four grooves 126, which are bored into the top of a base plate block 132. The base plate block 132 has numerous feet 134 to rest on the seafloor. Besides the four columns 122a, 122b, 122c, and 122c, and the base plate block 132, the hydrodynamic element also includes a nested machinery chamber 118; rotor assemblies 204a, 204b; fins 308a, 308b, 312a, 312b; and platform/bearing assembly 310, 314, 2600. In one embodiment, the hydrodynamic element includes mechanical, electrical, and electronic members to form a vertical axis hydraulic turbine for producing energy from ocean tides or river currents. Each hydrodynamic element is interconnected with other hydrodynamic element via latches to form the hydrodynamic array 200 (which is discussed hereinbelow).

Roadway spans 101a, 101b include guardrails 110a, 110b, 110c, and 110d for warding automobiles and people away from danger as they traverse the viaduct 100. In one embodiment, each guardrail 110a, 110b, 110c, and 110d is a barrier made of suitable material, such as steel cables, placed along the edges of the roadway spans 101a, 101b, and the edges of the median span 140a. Each roadway span 101a, 101b includes a side drain 136a, b, to allow precipitation on the roadway spans 101a, 101b, to withdraw. Each roadway span 101a, 101b includes a manhole cover 102 allowing access through a manhole 106 for reaching a triangular cavity 108 for housing pipes and other conduits, such as cables, through the viaduct 100.

Each roadway span 101a, 101b houses a platform on which guardrails 110b, 110c are mounted next to crane rails 112a, 112b, which are manufactured of raw steel forming a track for a wheeled vehicle that carries a crane for raising, shifting, or lowering members of the hydrodynamic element by means of a hoisting apparatus supported by the crane rails 112a, 112b. Adjacent to the crane rails 112a, 112b are equipment rails 114a, 114b for forming tracks for wheeled vehicles to carry various machinery. The median span 140a houses a machinery chamber hatch 116, which, upon removal, allows members of the hydrodynamic element to be raised, shifted, and lowered. Near the machinery chamber hatch 116 is a manhole cover 104 allowing access to ladders that lead to various spaces of the nested machinery chamber 118. The median span 140a is the top of the nested machinery chamber 118.

Each column, such as columns 122a, 122b, 122c, and 122d, includes an upper shelf, such as upper shelves 120a, 120b, 120c, and 120d (to hold upper fins 308a, 308b), and a lower shelf, such as lower shelves 124a, 124b, 124c, and 124d (to hold lower fins 312a, 312b). The foot of each column is fitted into a groove 126, which is housed by a base plate block 132. Each base plate block rests on a sea floor via multiple feet 134. Each base plate block is interconnected with another base plate block via latch termini 128a, 128b, to link hydrodynamic elements together to eventually form the hydrodynamic array 200.

In one embodiment, an arrangement of a quartet of columns 122a, 122b, 122c, and 122d, each thickly made from reinforced marine concrete having an elliptical or other suitable cross-sectional shape, are supported by numerous feet 134 below a base plate block mounted on the seafloor. Such an arrangement forms a foundation for stabilizing the other members of the hydrodynamic element. In one embodiment, the quartet of columns 122a, 122b, 122c, and 122d guides the water flow through a vertical axis hydrofoil turbine so that additional power is obtained from the varying directions of the water flow across the turbine hydrofoils, and from one turbine duct to another. To facilitate this effect, the relationship of the turbine blades, one to the other, is synchronized. Each turbine turns in the opposite rotation direction to its neighboring turbine the latter of which is supported by another quartet of columns. This arrangement of columns eliminates or reduces interference effects between the turbine blades and the duct walls, which can cause torque fluctuations and possible fatigue of either the duct walls or the turbine blades, with eventual consequent loss of power or structural failure.

Figure 2:
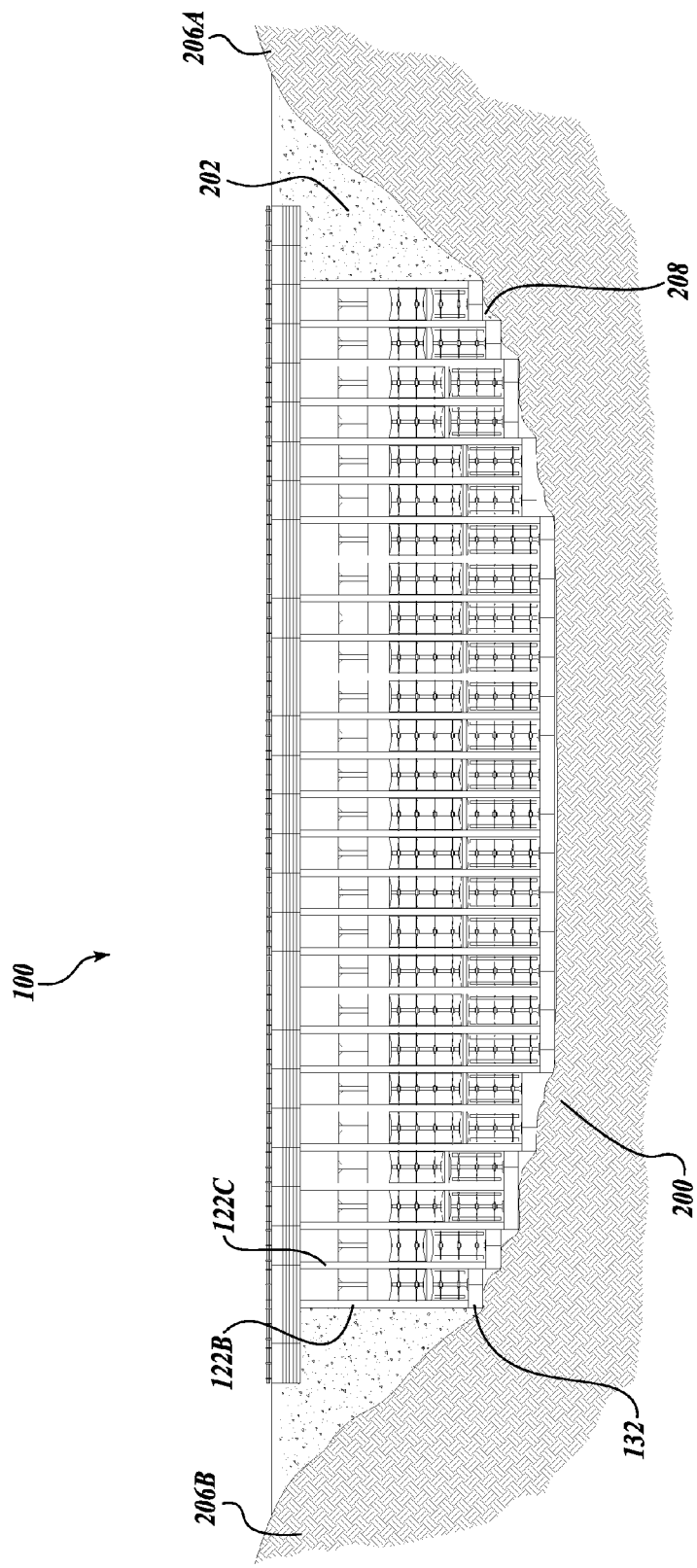
FIG. 2 is a side view of an exemplary viaduct on top of an exemplary hydrodynamic array.

FIG. 2 illustrates the viaduct 100 that extends across a waterway 202 to connect land bounds 206a, 206b, facilitating automobiles carrying passengers and vehicles carrying members of hydrodynamic elements to navigate across the waterway 208. Fill dirt 202 provides support for the viaduct 100 to reach land bounds 206a, 206b. As discussed previously, the viaduct 100 comprises multiple roadway spans (such as roadway spans 101a, 101b) that are interconnected with multiple median spans (such as median span 104a). Beneath the viaduct 100 is the hydrodynamic array 200, of which the hydrodynamic elements are arranged among quartets of columns (such as columns 122a, 122b, 122c, and 122d) supporting a pair of roadway spans and a single median span. Each hydrodynamic element of the hydrodynamic array 200 comprises one or more rotor assemblies supported by the quartet of columns that sits upon a base plate block 132 configured to receive the motion of ocean tides or river currents acting against each hydrodynamic element to generate electricity. The quartet of columns serves as structural support for the top, center, and bottom platforms 310, 314, and 2600 that also house bearing assemblies, and in some embodiments, enhance the hydrofoil aspect ratio. As discussed before, the quartet of columns supports the nested machinery chamber 118, which houses the journal and thrust bearings configured to mechanically couple to the rotor assemblies.

In one embodiment, the viaduct 100 crosses the waterway 208 with the hydrodynamic array 200 built from hydrodynamic elements that include single or double (stacked) rotor assemblies. In this embodiment, no onshore equipment or supporting infrastructure is needed. The porous structure of the hydrodynamic array 200 allows ocean tides or river currents to ebb after flowing. Silting is eliminated or reduced, and marine life can pass through unharmed. In this embodiment, pollution is inhibited as the submerged bearings are water lubricated. The heavy, high voltage power cables are suitably shielded against electromagnetic radiation to protect electronic equipment, vehicles, and maintenance personnel. The generators (housed by the generator chamber 544) are air cooled. In the same embodiment, the nested machinery chamber 118 is air conditioned to prevent equipment overheating. The nested machinery chamber 118 may also be insulated and soundproofed to avoid disturbing local inhabitants and wildlife, which includes marine life.

Figure 3:
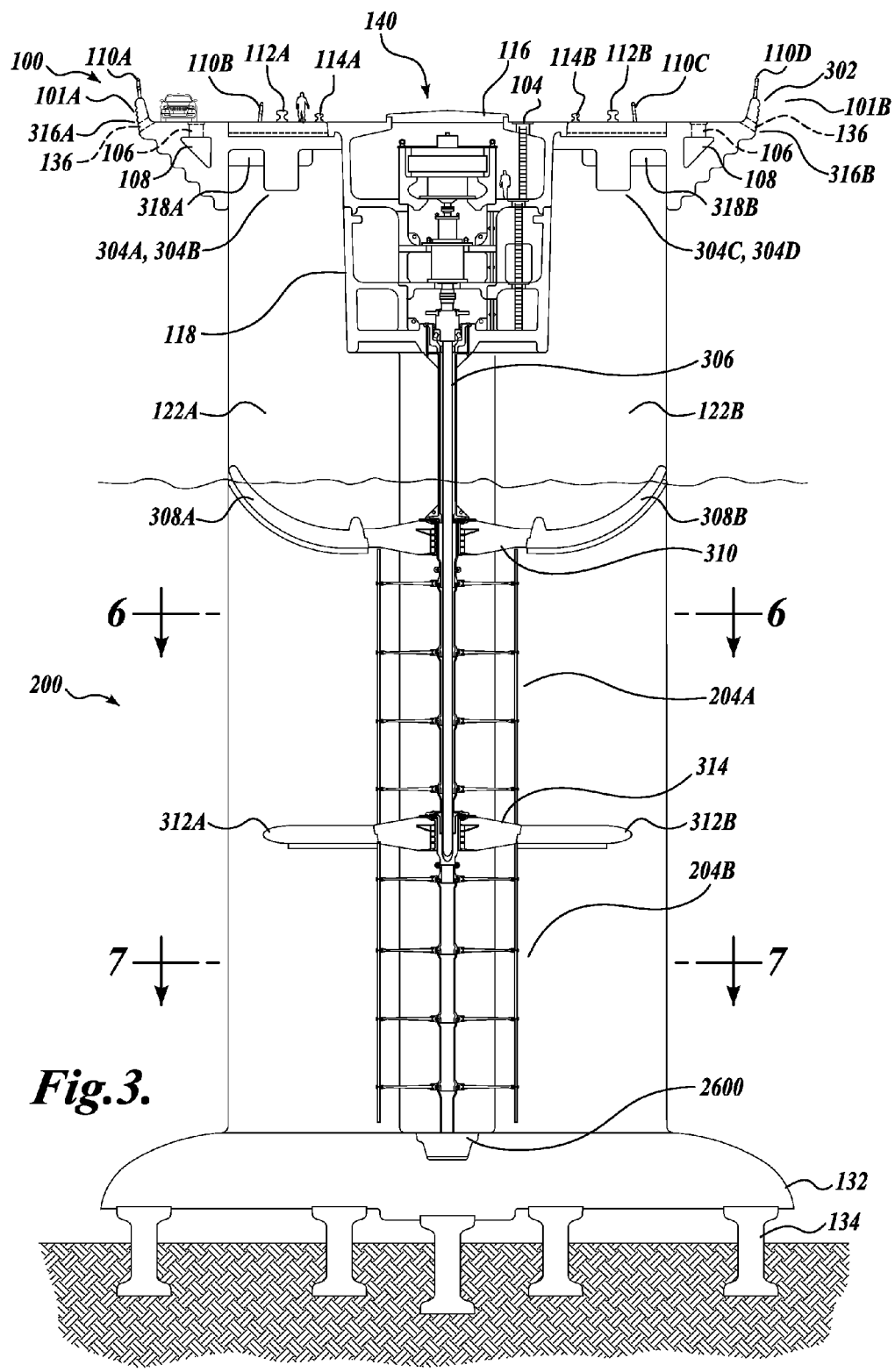
FIG. 3 is a cross-sectional, front view of an exemplary viaduct on top of an exemplary hydrodynamic array.

FIG. 3 illustrates the viaduct 100 being supported by columns, such as columns 122a, 122b, 122c, and 122d that are members of a hydrodynamic element, one of many hydrodynamic elements comprising the hydrodynamic array 200. As discussed previously, the viaduct 100 comprises roadway spans, such as roadway spans 101a, 101b. Each roadway span 101a, 101b is in parallel to each other and comprises safety walls 316a, 316b on which guardrails 110a, 110d are mounted and beneath which side drains 136a, 136b are bored to allow withdrawal of precipitation on the roadway spans 101a, 101b.

Each roadway span 101a, 101b houses platforms on which the guardrails 110b, 110c are mounted, the crane rails 112a, 112*b* are installed, and the equipment rails 114*a*, 114*b* are situated to form a track for wheeled vehicles to carry equipment to various locations along the median strip 140. The machinery chamber hatch 116 allows access to the machinery in the nested machinery chamber 118 for maintenance and so on. The manhole cover 104 allows engineers and other personnel to access machinery in the nested machinery chamber 118. Each roadway span 101*a*, 101*b* includes a manhole cover 102 providing access to a manhole 106 to reach triangular cavity 108 where cables, among other things, are placed.

Each roadway span 101*a*, 101*b* includes one or more feet 318*a*, 318*b* configured to rest transversely on top of the columns 122*a*, 122*b*, and one or more tenons. Tenons 304*b*, 304*d* project from the bottom of the roadway spans 110*a*, 110*b* for insertion into mortises 304*a*, 304*c* of the columns 122*a* and 122*b*. Projecting basipetally from the nested machinery chamber 118 is a torque drive shaft 306 that is coupled to an upper rotor assembly 204*a* and a lower rotor assembly 204*b*. The torque drive shaft 306 is also coaxially aligned with an upper platform/bearing assembly 310 and a center platform/bearing assembly 314. Holding the upper platform/bearing assembly 310 rigidly into place among the quartet of columns are upper fins 308*a*, 308*b*. Similarly, lower fins 312*a*, 312*b* rigidly maintain the center platform/bearing assembly 314 in place among the quartet of columns, which are placed on top of the base plate block 132, which itself rests on multiple feet 134 on the sea floor 130.

In one embodiment, the width of each member of the quartet of columns 122*a*, 122*b*, 122*c*, and 122*d*, as well as the height from the feet 134 to the nested machinery chamber 118, help to eliminate or reduce water flow blockage. The height of the quartet of columns 122*a*, 122*b*, 122*c*, and 122*d* also keeps the nested machinery chamber 118 above unusual wave heights, driven by violent weather patterns. Such an arrangement isolates the nested machinery chamber 118, and inhibits or reduces capsizing forces due to unusual wave heights. Also in this embodiment, the floor of the nested machinery chamber 118 provides in essence an upper end plate effect for the rotor assemblies a few meters below low tide level to prevent cavitation of the hydrofoils. In one embodiment, the base plate block 132, whose grooves form an egg-crate like structure, with feet 134 forming a web structure, are configured to further stabilize the hydrodynamic element. The web structure also prevents or reduces seawater from flowing under the base plate block.

To facilitate raising, shifting, and lowering members of the hydrodynamic element, each of the bearing support structures (such as the upper platform/bearing assembly 310, the center platform/bearing assembly 314, and the lower platform/bearing assembly 2600) is engineered to have a configuration that incorporates a portion of the bearings through which the torque drive shaft is positioned. The orifices defined by these bearing support structures are larger than the torque drive shaft diameter. In addition, a bearing support structure that is lower than a bearing support structure above is suitably smaller than the one above it to allow raising, shifting, and lowering into place.

The nested machinery chamber 118, as a member of the hydrodynamic element, is suitably manufactured from reinforced concrete elements. The nested machinery chamber 118 may be raised, shifted, or lowered through the machinery chamber hatch 116 using a suitable crane moved into position using the crane rails 112*a*, 112*b*. Suitably, the generator chamber housed by an upper machinery chamber 514 is removed first in a process of disassembling members of the hydrodynamic element. Next, the crane removes an upper machinery chamber 514, followed by pieces of equipment housed by the lower machinery chamber 516, the lower machinery chamber 516 itself, and the assemblies connected with the torque drive shaft 306, such as the upper platform/bearing assembly 310, the upper rotor assembly 204*a*, the center platform/bearing assembly 314, the lower rotor assembly 204*b*, and the lower platform/bearing assembly 2600. Each assembly is disassembled in turn as each is withdrawn and is subsequently moved by the crane to an equipment vehicle positioned on the equipment rails 114*a*, 114*b* for transportation. As would be appreciated by one skilled in the art, the process of assembling members of the hydrodynamic element occurs in a time reversal fashion to the sequence of events discussed above.

Figure 4:
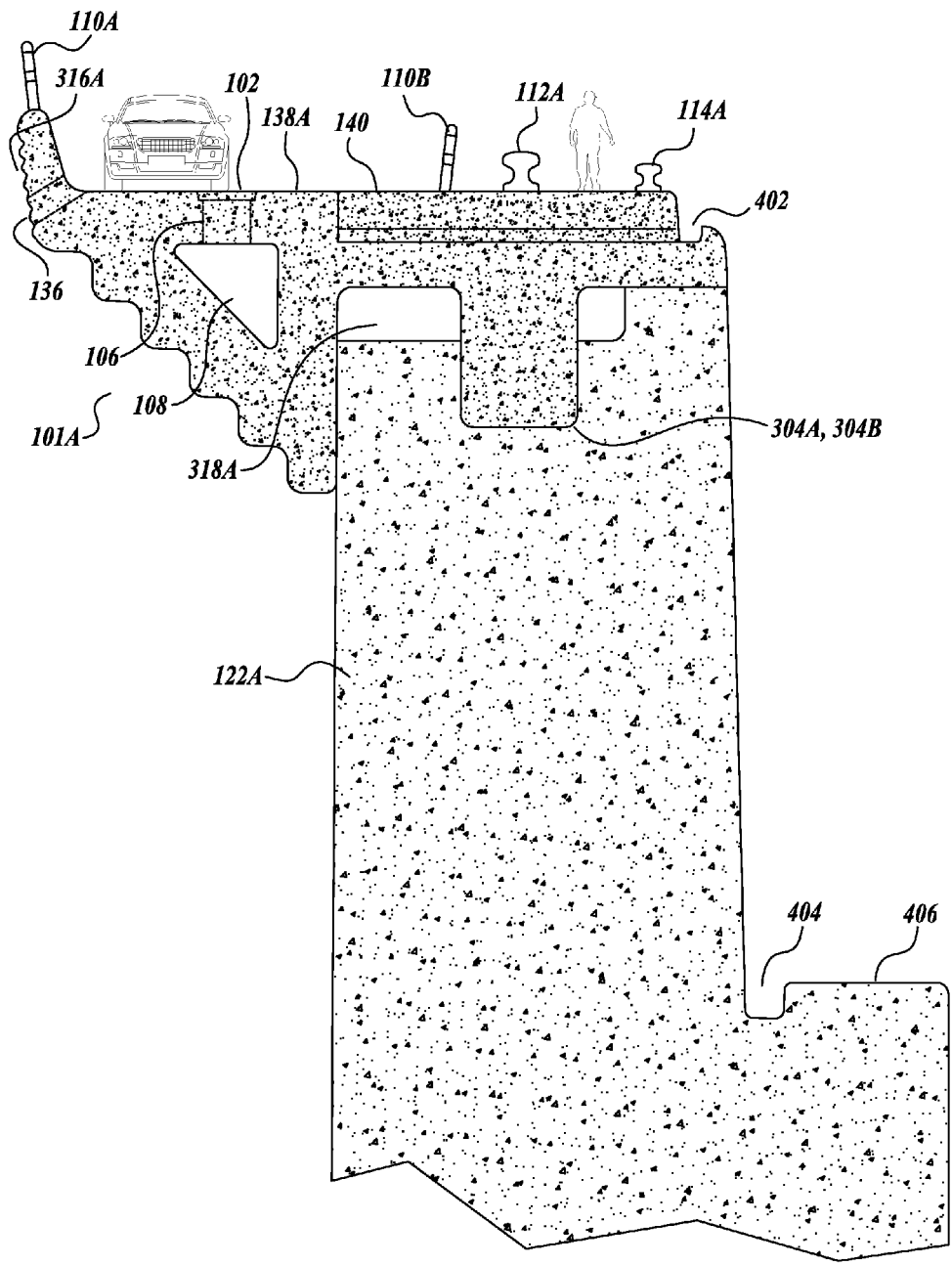
FIG. 4 is a cross-sectional, front view of a portion of an exemplary viaduct on top of a portion of an exemplary hydrodynamic array.

FIG. 4 illustrates an interconnection between a roadway span (such as the roadway span 101*a*) and a column (such as the column 122*a*) in greater detail. As previously discussed, the roadway span 101*a* includes guardrails 110*a*, 110*b* to prevent an automobile from trespassing beyond the safety wall 316*a* or veering into the median span 140. On the roadway 138*a* is a manhole cover 102 allowing access to the manhole 106 to reach the triangular cavity 108, which is configured to carry power and communication cables, fresh water mains, and other non-flammable and non-explosive substances. The side drain 136 allows precipitation on the roadway 138 to withdraw. The median span 140 also includes crane rails 112*a* as well as equipment rail 114*a*.

A latitudinal latch terminus 402 allows the roadway span 101*a* to mate and engage the median span 140*a* so as to fasten to the median span 140*a*. More specifically, the latitudinal latch terminus 402 of the roadway span 101*a* mates with the latitudinal match terminus 508*a* of the nested machinery chamber 118 (the top of which is the median span 140*a*). The foot 318*a* protruding from the roadway span 101*a* sits transversely on top of the column 122*a*. Further, projected from the bottom of the roadway span 101*a* is the tenon 304*b* that mates with the U-shaped mortise 304*a* on top of the column 122*a*. A ledge 406 is joined to the top of the column 122*a* via a rectangular mortise 404, which mates with the bottom of the nested machinery chamber 118 to securely support it.

Figure 5:
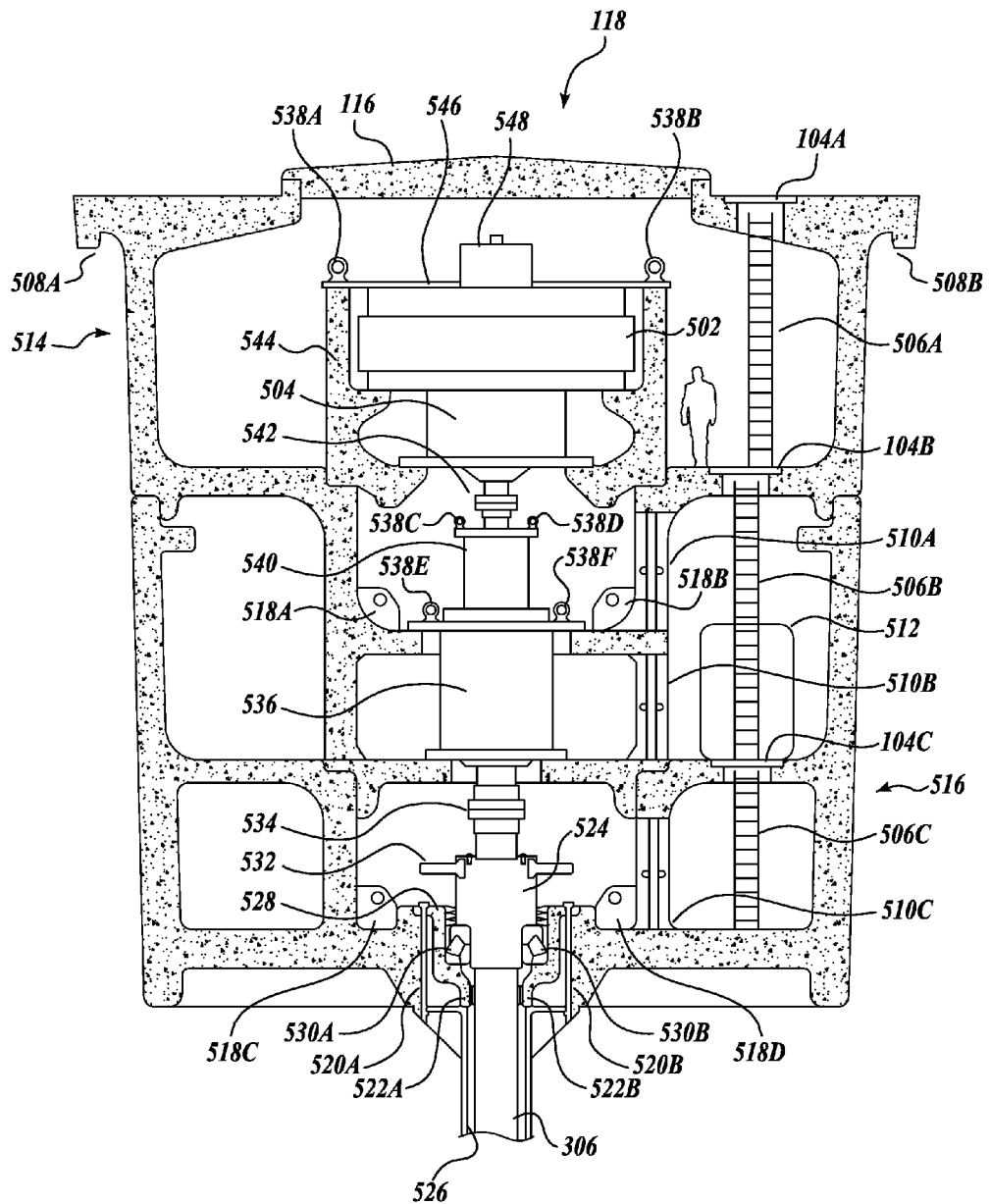
FIG. 5 is a cross-sectional, front view of an exemplary nested machinery chamber.

FIG. 5 illustrates the nested machinery chamber 118. At its apex, the nested machinery chambers 118 are covered by a machinery chamber hatch 116, which upon opening, allows access to the equipment inside. The sides of the nested machinery chamber 118 conclude with latitudinal latch termini 508*a*, 508*b*, which mate with corresponding latitudinal latch termini, such as the latitudinal latch terminus 402 of the roadway span 101*a*, to structurally fasten the nested machinery chamber 118 into an opening defined by a quartet of columns, such as columns 122*a*, 122*b*, 122*c*, and 122*d*, underneath a pair of roadway spans 101*a*, 101*b*. A set of manhole covers 104*a*, 104*b*, 104*c* provide access to upper ladder 506*a*, middle ladder 506*b*, and lower ladder 506*c*, each in turn allowing personnel to access the nested machinery chamber 118. Near the lower manhole cover 104*c* is a hatchway 512 giving access to one or more interconnected, nested machinery chambers 118. A set of fireproof steel doors 510, 510*b*, 510*c* more specifically allow personnel to access and maintain pieces of equipment connected with a hydrodynamic element.

The nested machinery chambers 118 include an upper machinery chamber 514 and a lower machinery chamber 516. The lower machinery chamber 516 has contoured reinforced ledges which mate with ledges on the upper machinery chamber 514 to secure the two chambers together. The upper machinery chamber 514 is accessible via the manhole cover 104*a* and the ladder 506*a*. The upper machinery chamber 514 houses a generator chamber 544. With the opening of the machinery chamber hatch 116, the generator chamber 544 can be placed inside the upper machinery chamber 514 via eye bolts 538a, 538b, which are used to hoist the generator chamber 544 slowly into the inside of the upper machinery chamber 514. The top of the generator chamber 544 is lidded by a safety cover 546. Mounted on top of the safety cover 546 is an exciter 548, which is either a generator or a battery that supplies electric current used to produce a magnetic field in a synchronous generator 502. The generator 502 converts mechanical energy received from a thrust bearing 504 to electrical energy.

The thrust bearing 504 is mechanically coupled to a gear box 540 via high-speed gear coupling 542. The gear box 540 is used here for illustrative purposes in one embodiment. However, any suitable gearing or transmission may be used, such as a direct drive permanent magnet variable speed generator. Eye bolts 538c, 538d allow the gear box 540 to be hoisted to its position within the lower machinery chamber 516. Lugs 518a, 518b allow a portion of the lower machinery chamber 516 to be hoisted into place inside the nested machinery chambers 518. Coupled to the gear box 540, which allows variable speed, is an epicyclic train 536 which comprises a series of moving mechanical parts that transmit and modify mechanical energy communicated by the gear box 540 to the thrust bearing 504. Eye bolts 538e, 538f allow the epicyclic train 536 to be lowered into the lower machinery chamber 516. The epicyclic train 536 is mechanically coupled to a torque shaft head 524 via a low-speed gear coupling 534. A disk brake 532 regulates the velocity of the torque shaft head 524 by providing friction from a caliper pressing against the sides of the torque shaft head 524. A neck 528 coaxially locates the torque shaft head via spherical roller thrust bearing 530a, 530b. Oil is provided to lubricate the spherical roller thrust bearing 530a, 530b. Oil seals 522a, 522b prevent leakage of the oil into a torque shaft cover 526, hence protecting the torque shaft 306. The neck 528 is fastened to the lower machinery chamber 516 via bolts 520a, 520b. The remaining portion of the lower machinery chamber 516 is hoisted into place via lugs 518c, 518d.

In one embodiment, the nested machinery chamber 118 is fabricated using a suitable material. One suitable material includes reinforced marine concrete. Another suitable material includes a corrosion-resistant metal. The generator chamber 544 is fabricated using a suitable material. One suitable material includes heavily reinforced concrete. The generator chamber 544 with upper and lower support ledges is nested securely in the upper machinery chamber 514. The generator chamber 544 suitably is formed as a cylindrical structure, which functions as a containment vessel in the event that the generator 502 should fail, such as from a structural failure or from being sped errantly to cause disintegration. The top of the generator chamber 544 protects the generator 502 from debris or tools and so on.

For oil-lubricated spherical roller thrust bearings 530a, 530b, the oil is supplied from an adjacent pressurized lubrication tank (not shown), which has provisions for cooling, circulating, and pumping out the oil prior to removing the torque shaft spline drive. The lubrication system also provides oil to the torque shaft at the junction of the upper rotor assembly and the lower rotor assembly. The lubrication system is integrated with other systems for pumping, cooling, conditioning, and detecting contaminants, as well as salt water removal, overheating and level alarms.

Figure 6:
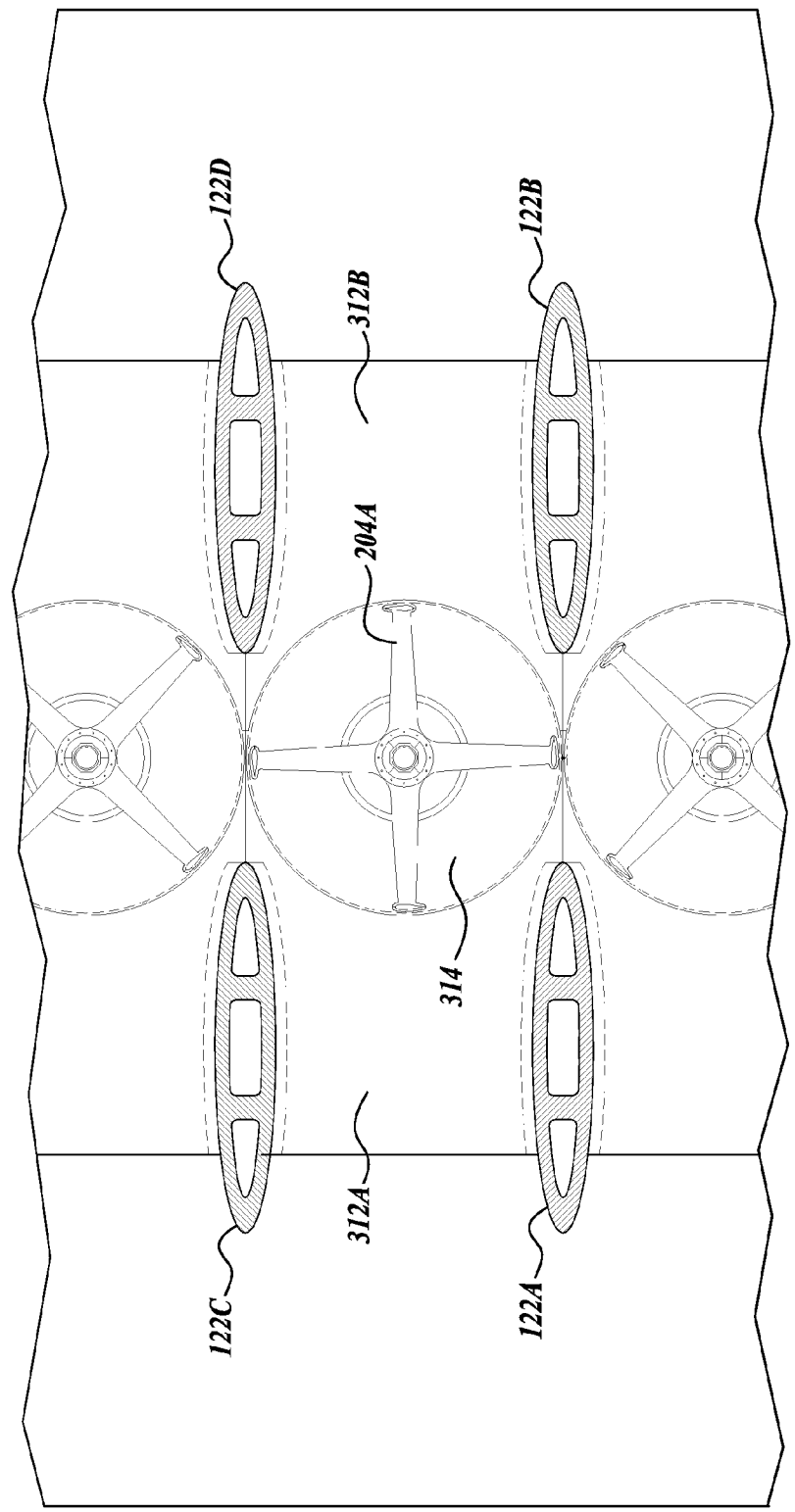
FIG. 6 is a cross-sectional, plan view of an exemplary hydrodynamic array.

FIG. 6 is a cross-sectional view of the hydrodynamic array 200 taken below the upper platform/bearing assembly 310. Two members of the quartet of columns are in parallel to the other two remaining members of the quartet of columns. For example, columns 122a, 122b are in parallel position with respect to columns 122c, 122d. Cross sections of the four columns, 122a, 122b, 122c, and 122d, are illustrated. A set of lower fins 312a, 312b rests on the shelves of the columns 122a, 122b, 122c, and 122d. More specifically, the lower fin 312a is secured between columns 122a, 122c. The lower fin 312b is secured between columns 122b, 122d. Also illustrated is a rotor assembly 204a. Suitably, other rotor assemblies adjacent to the rotor assembly 204a turn in an opposing direction from the direction of the rotor assembly 204a.

Figure 7:
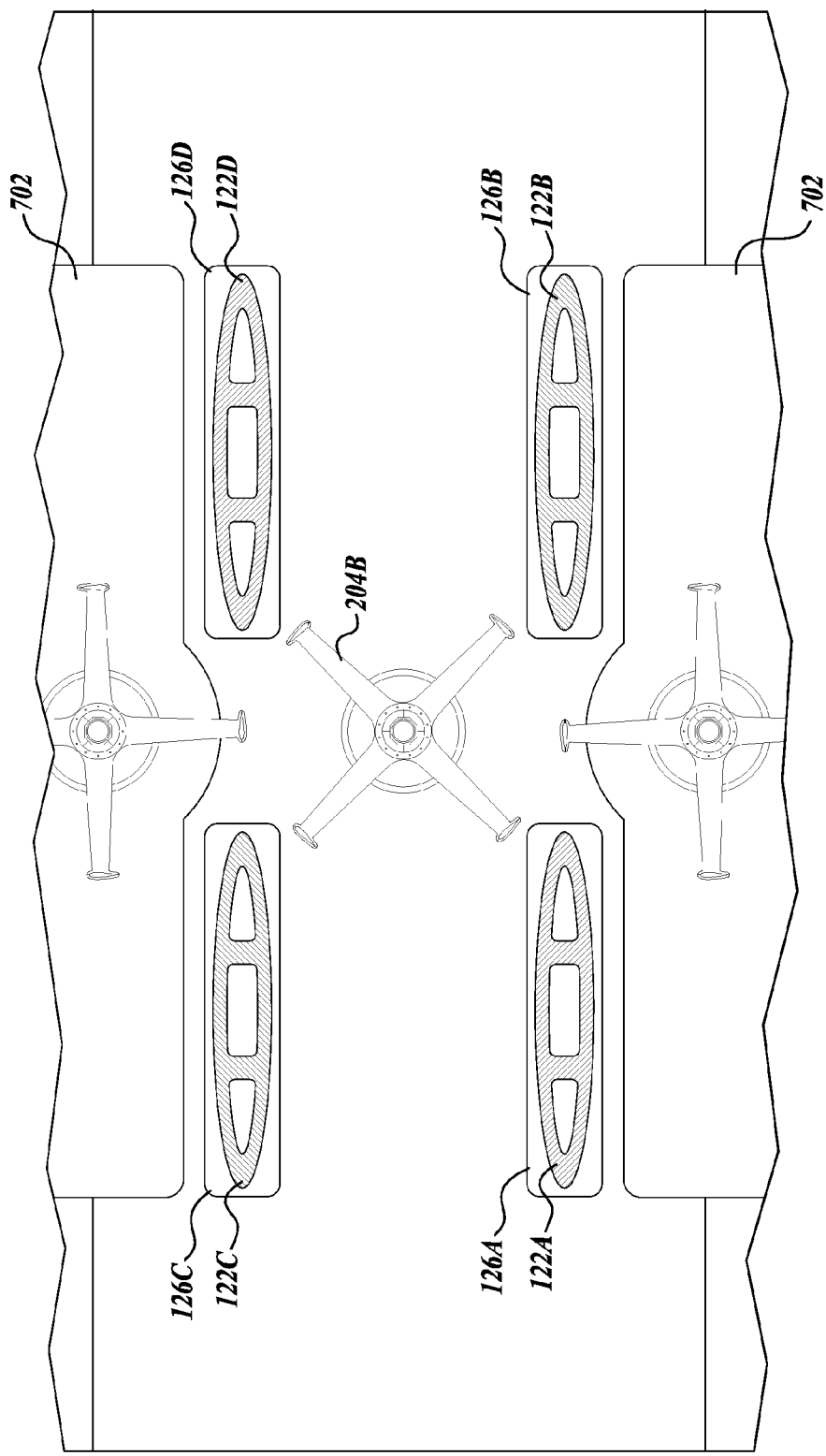
FIG. 7 is a cross-sectional, plan view of an exemplary hydrodynamic array.

FIG. 7 is a cross-sectional view of the hydrodynamic array 200 taken below the center platform/bearing assembly 314. Two members of the quartet of columns are in parallel to the other two remaining members of the quartet of columns. For example, columns 122a, 122b are in parallel position with respect to columns 122c, 122d. Cross sections of the four columns, 122a, 122b, 122c, and 122d, are illustrated. Grooves 126a, 126b, 126c, and 126d house the feet of the columns 122a, 122b, 122c, and 122d. Also illustrated are T-shaped latch members 702. The lower rotor assembly 204b is shown 45 degrees out of phase with the adjacent rotor assemblies on top of the T-shaped latch members 702 to illustrate the opposing direction that the lower rotor assembly 204b turns with respect to its adjacent neighboring lower rotor assemblies.

Figure 8:
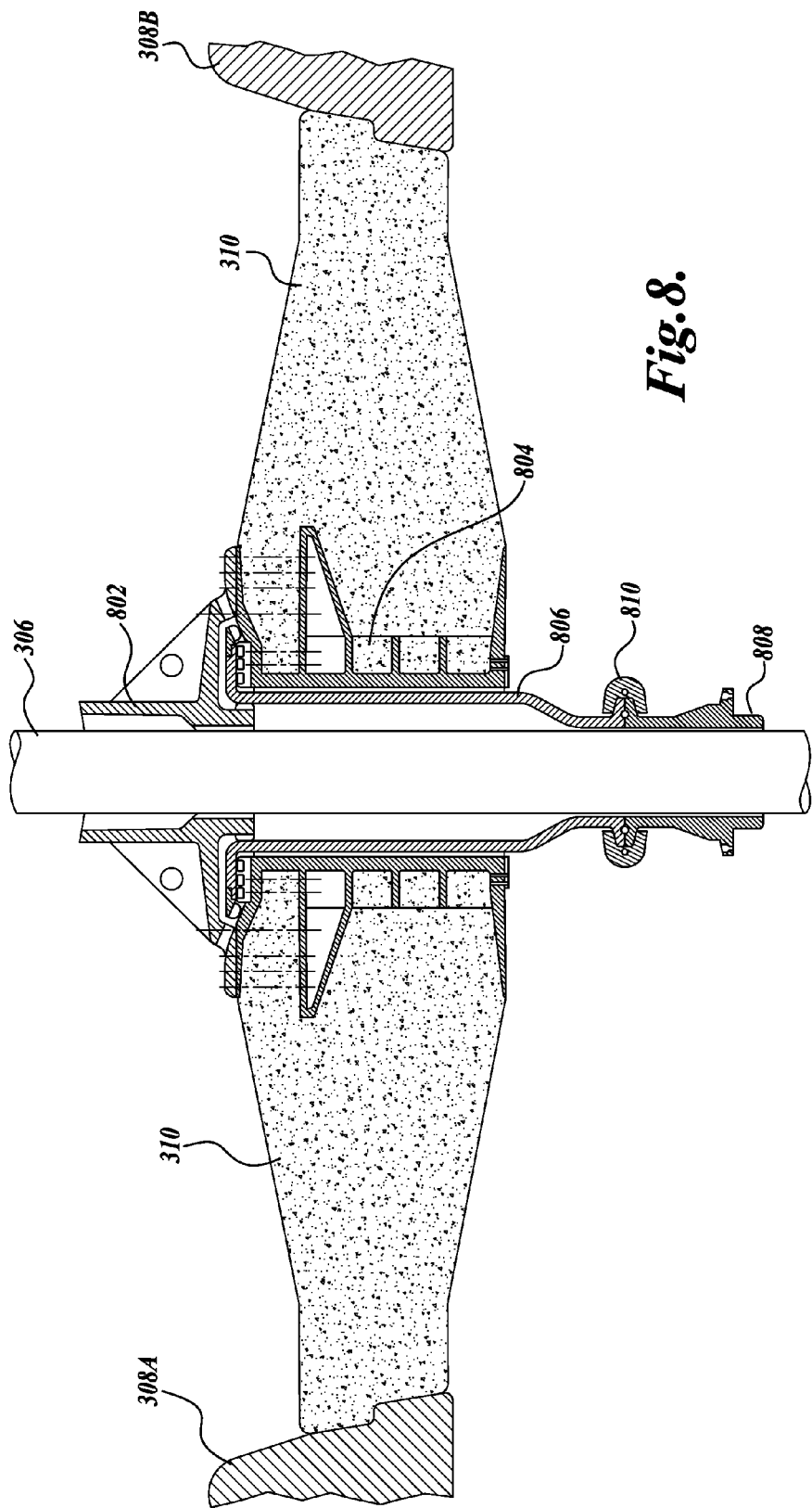
FIG. 8 is a cross-sectional, side view of an exemplary upper platform/bearing assembly.

FIG. 8 illustrates a cross-sectional, side view of the upper platform/bearing assembly 310. A torque shaft 306 is coaxially aligned with the upper platform/bearing assembly 310. A torque shaft cover 802 includes lifting lugs that allow the upper platform/bearing assembly 310 to be raised, shifted, or lowered into position against the ledges of the upper fins 308a, 308b. Surrounding the torque shaft 306 is a bearing cylinder 806, which is axially aligned with stave bearing elements 804. The bearing cylinder 806 is mechanically coupled to a shaft segment 808 via a C-shaped clamp 810.

In one embodiment, the bearing assembly portion of the upper platform/bearing assembly 310 is formed from a thick-walled cylinder with disc and ribs that are embedded in the upper platform/bearing assembly 310. The interiors of the cylinders are machined to support stave bearing elements 804, suitably made from heavy-duty composite water-lubricated structures. Suitably, the stave bearing elements are kept from overheating although they can function under extreme abuse, such as with high fluctuating loads, grit and other contaminants, misalignment and water flow blockage. It is suitable to circulate seawater through the stave bearing elements 804 to reduce overheating. Water circulation is facilitated by the upper and lower rotor assemblies 204a, 204b as they draw seawater up between the stave bearing elements 804 and expel the seawater through the exhaust holes (not shown) in the torque shaft cover 802. Since warm seawater tends to rise from heating of the stave bearing elements 804, this assists in the circulation of the seawater through the spaces among the stave bearing elements 804.

Figure 9:
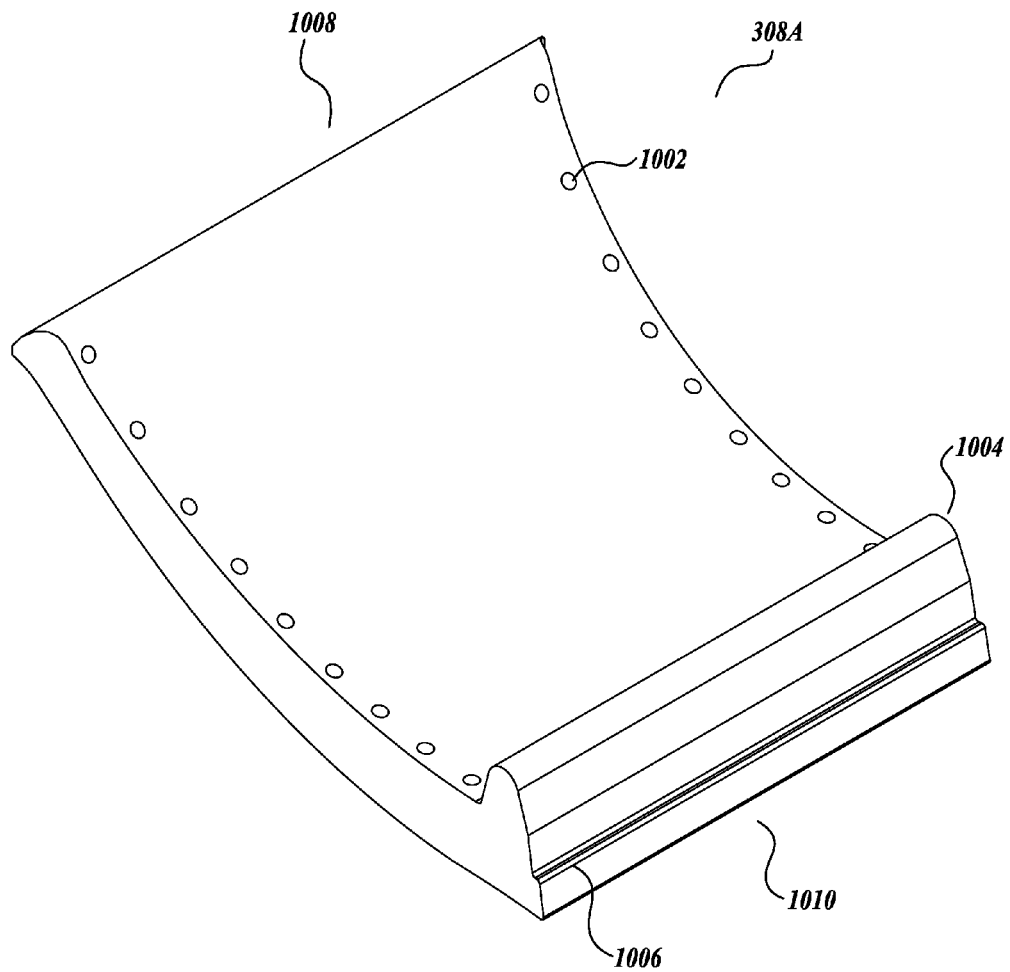
FIG. 9 is an isometric view of an exemplary upper fin.

FIGS. 9, 10, and 11 illustrate an exemplary upper fin, whose implementation includes the pair of upper fins 308a, 308b, which are secured to the shelves 120a, 120b, 120c, and 120d of quartet of columns 122a, 122b, 122c, and 122d. The upper fin 308a includes a distal end 1008 and a proximal end 1010. At the proximal end 1010, a knob 1004 protrudes and forms a ledge 1006 at the terminus of the upper fin 308a. A number of holes 1002 accommodate bolts that secure the upper fin onto the shelves 120a, 120b, 120c, and 120d of the columns 122a, 122b, 122c, and 122d.

In one embodiment, the upper fins are used in pairs. The pair of upper fins helps to eliminate or reduce cavitation and wave diversion. Suitably, each upper fin is formed from reinforced concrete. Each upper fin is attached to each side of two members of the quartet of columns by bolts, suitably at a corrosion-resistant angle. The pair of upper fins (such as the pair of upper fins 308a, 308b) maintains separation of the quartet of columns and stabilizes its alignment as well as supports the upper platform/bearing assembly 310. The pair of upper fins has upward curving distal ends 1008 to guide the flow of ocean tides or river current under the upper fins to a depth that eliminates or reduces cavitation while providing ventilation of the upper/lower rotor assemblies. The height of the distal end 1008 is such that normal ocean tides and river currents are directed through the upper/lower rotor assemblies, while waves driven by violent weather patterns pass above the upper fins (in combination with the upper platform/bearing assembly 310) and the bottom of the nested machinery chamber 118.

Figure 12:
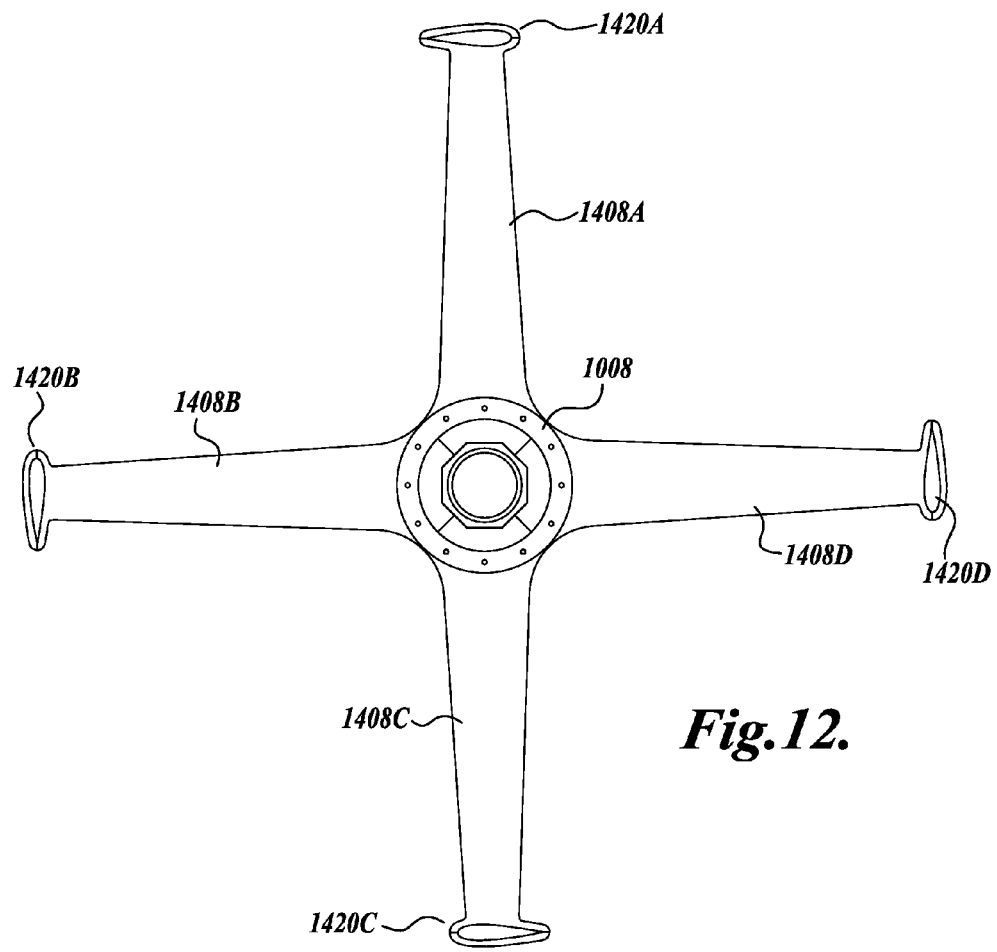
FIG. 12 is a plan view of an exemplary rotor assembly.
Figure 13:
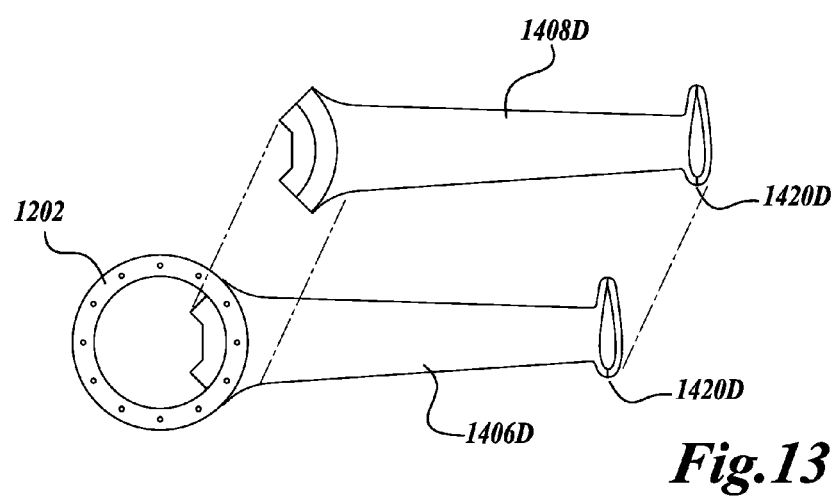
FIG. 13 is a plan view of an exemplary ring clamp and an exemplary blade support arm.

FIGS. 12 and 13 illustrate a plan view of a stage of a rotor assembly, such as the upper rotor assembly 204a or the lower rotor assembly 204b. A stage of the rotor assembly comprises four blades, 1420a, 1420b, 1420c, and 1420d that are coupled to a ring clamp 1202 via blade support arms 1408a, 1408b, 1408c, and 1408d. Each rotor assembly comprises multiple stages interconnected with each other through one or more shaft segments. Suitably a rotor assembly has four stages, but any number of stages is possible. The rotor assembly (upper/lower rotor assemblies 204a, 204b) is an active element in the hydrodynamic element, capturing ocean tidal energy or river current energy by the blades 1420a, 1420b, 1420c, and 1420d. The blades (or foils) 1420a, 1420b, 1420c, and 1420d produce significant lift. The mechanical energy in the lift is communicated to the drive shaft as torque through the blade support arms. And this mechanical energy is further communicated and relayed by various members of the hydrodynamic element to drive the generator 502 through the gearbox 540.

Figure 14:
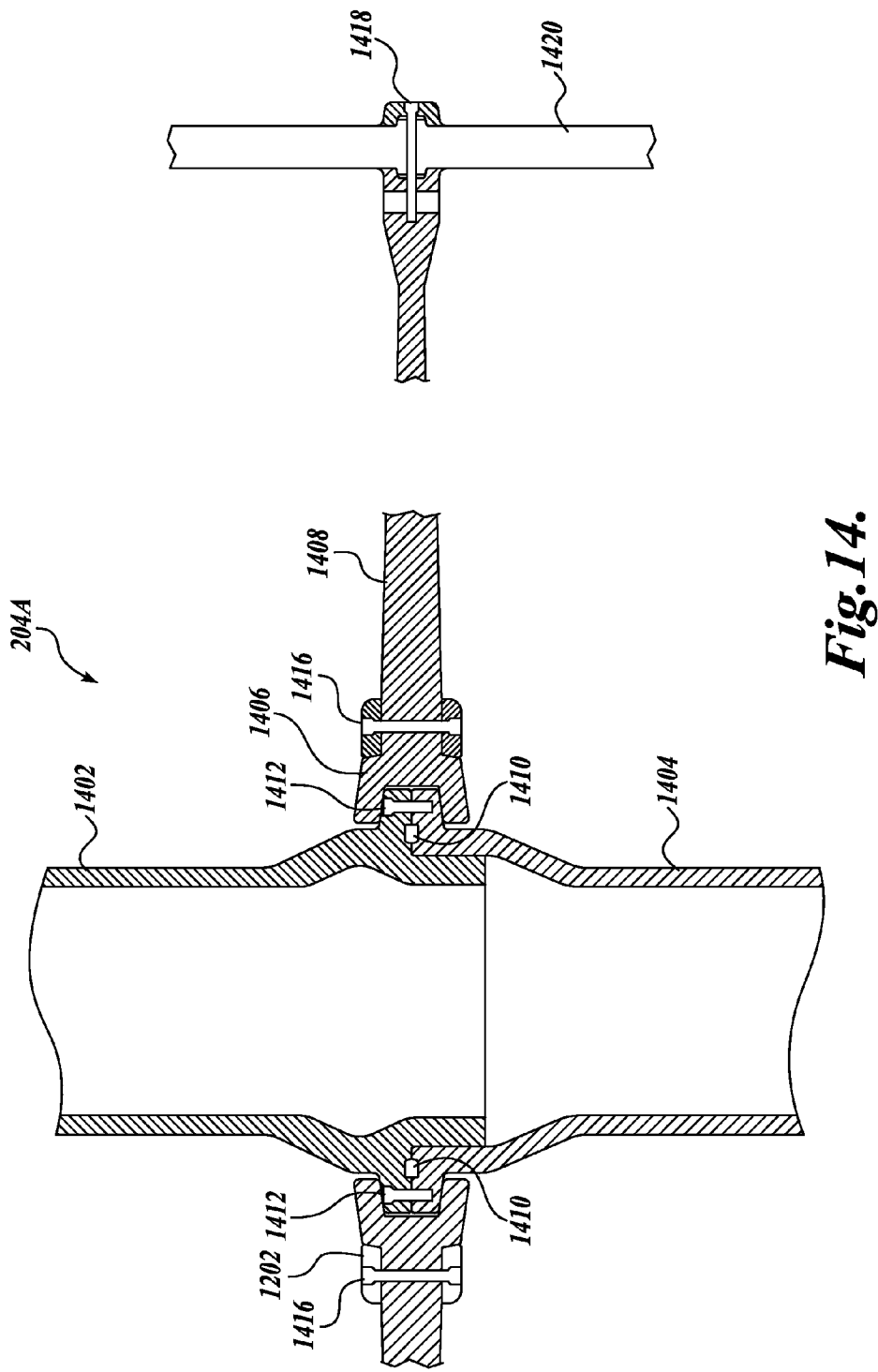
FIG. 14 is a cross-sectional, side view of a section of an exemplary rotor assembly.

FIG. 14 illustrates a portion of the rotor assembly, such as the upper rotor assembly 204a, in greater detail. Shaft segments 1402, 1404 are coupled together via a C-shaped terminus 1406 of a blade support arm 1408. The C-shaped terminus 1406 is fastened via one or more bolts 1416 piercing through the pre-bored holes in the ring clamp 1202. One or more alignment bolts 1412 situate the shaft segment 1402 with the shaft segment 1404. One or more seals 1410 provide a tight closure to inhibit fluids from entering the shaft segments 1402, 1404. At the distal end of the blade support arm 1408, one or more blades 1420 are coupled via one or more bolts 1418.

Figure 15:
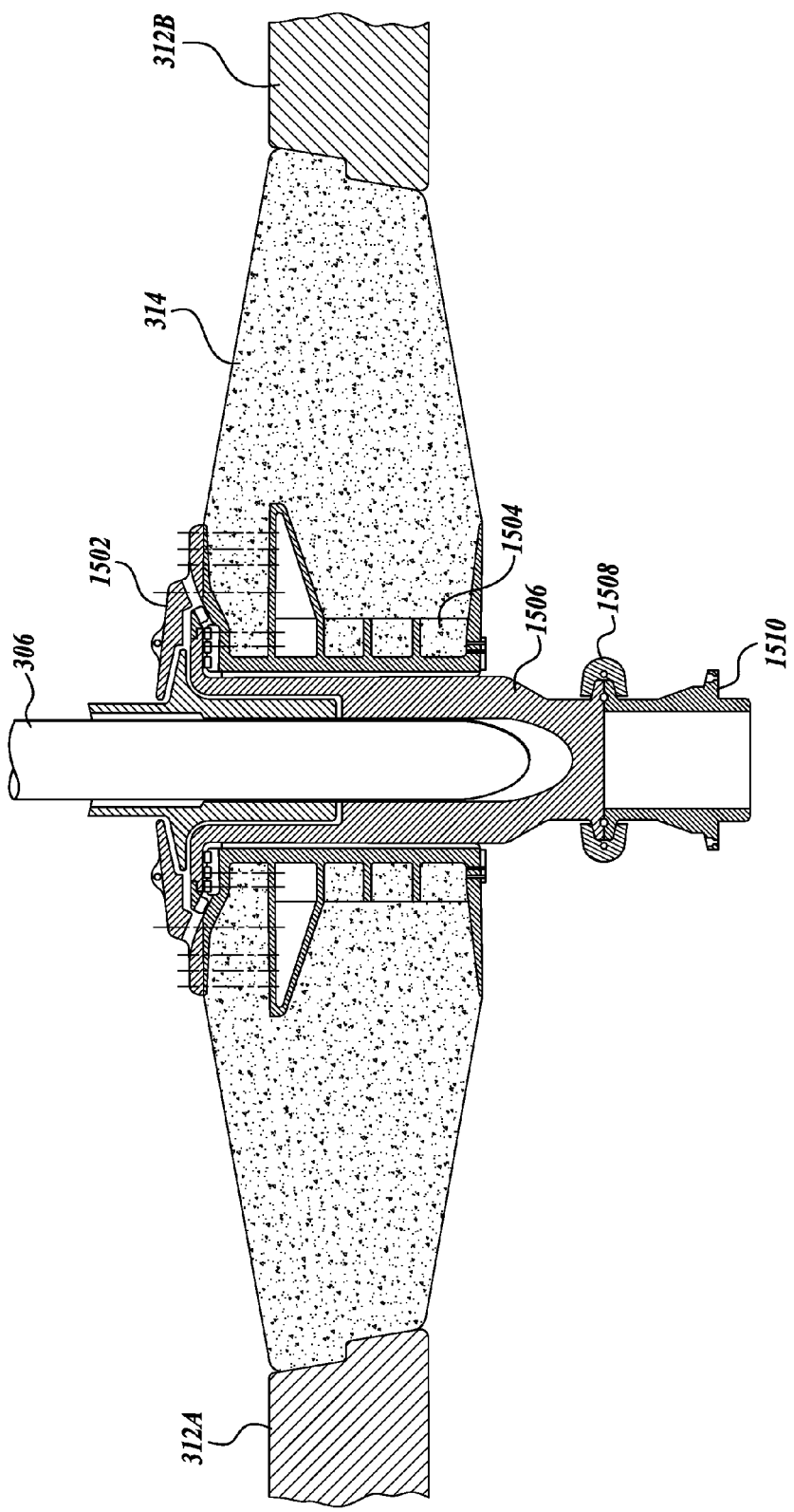
FIG. 15 is a cross-sectional, side view of an exemplary center platform/bearing assembly.

FIG. 15 illustrates a cross-sectional view of the center platform/bearing assembly 314 in greater detail. The torque shaft 306 coaxially locates with respect to the center platform/bearing assembly 314. A rotor lift cover 1502 includes lugs for allowing the center platform/bearing assembly 314 to be raised, shifted, or lowered, and mates with the ledge termini of a pair of lower fins 312a, 312b. A bearing cylinder 1506 is coupled to a shaft segment 1510 via a C-shaped clamp 1508. The bearing cylinder 1506 engages with stave bearing elements 1504. The center platform/bearing assembly 314 is suitably formed from a circular shape, which is configured to allow the center platform/bearing assembly 314 to pass through the opening provided by the pair of upper fins 308a, 308b. The center platform/bearing assembly 314 has tapered ledge termini to mate with the lower fins 312a, 312b, so as to allow the lower fins 312a, 312b to carry the weight of the center platform/bearing assembly 314 and the lower rotor assembly 204b.

In one embodiment, the bearing assembly portion of the center platform/bearing assembly 314 is formed from a thick-walled cylinder with disc and ribs that are embedded in the center platform/bearing assembly 314. The interiors of the cylinders are machined to support stave bearing elements 1504, suitably made from heavy-duty composite water-lubricated structures. Suitably, the stave bearing elements are kept from overheating although they can function under extreme abuse, such as with high fluctuating loads, grit and other contaminants, misalignment, and water flow blockage. It is suitable to circulate seawater through the stave bearing elements 1504 to reduce overheating. Water circulation is facilitated by the upper and lower rotor assemblies 204a, 204b as they draw seawater up between the stave bearing elements 1504 and expel the seawater through the exhaust holes (not shown) in the torque shaft cover 1502. Since warm seawater tends to rise from heating of the stave bearing elements 1504, this assists in the circulation of the seawater through the spaces among the stave bearing elements 1504.

Figure 16:
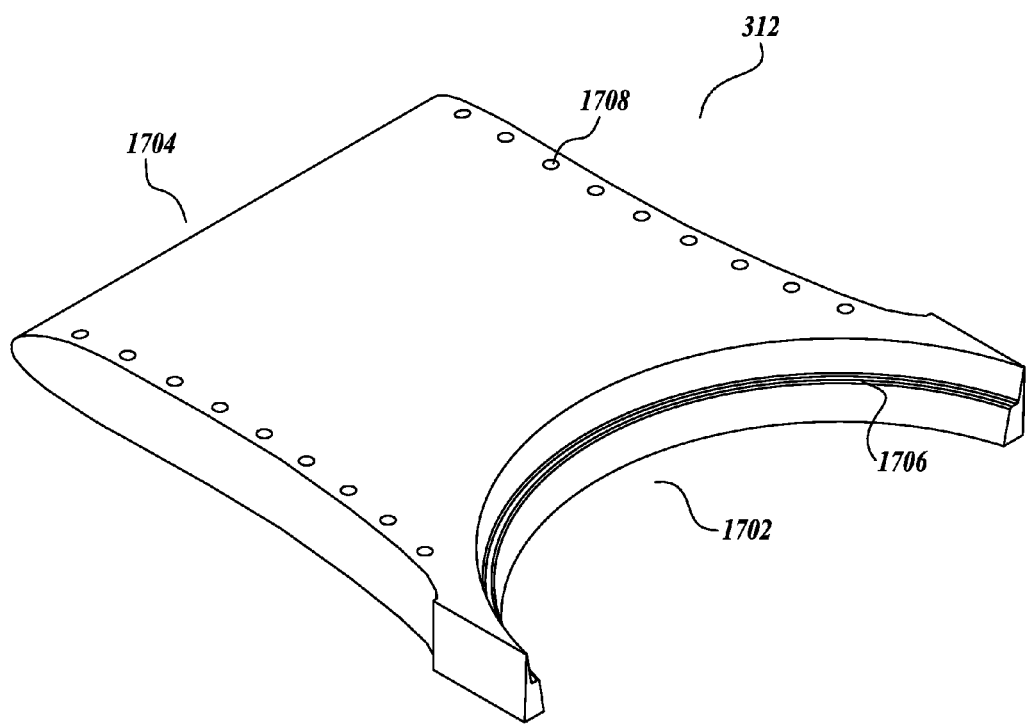
FIG. 16 is an isometric view of an exemplary lower fin.
Figure 17:
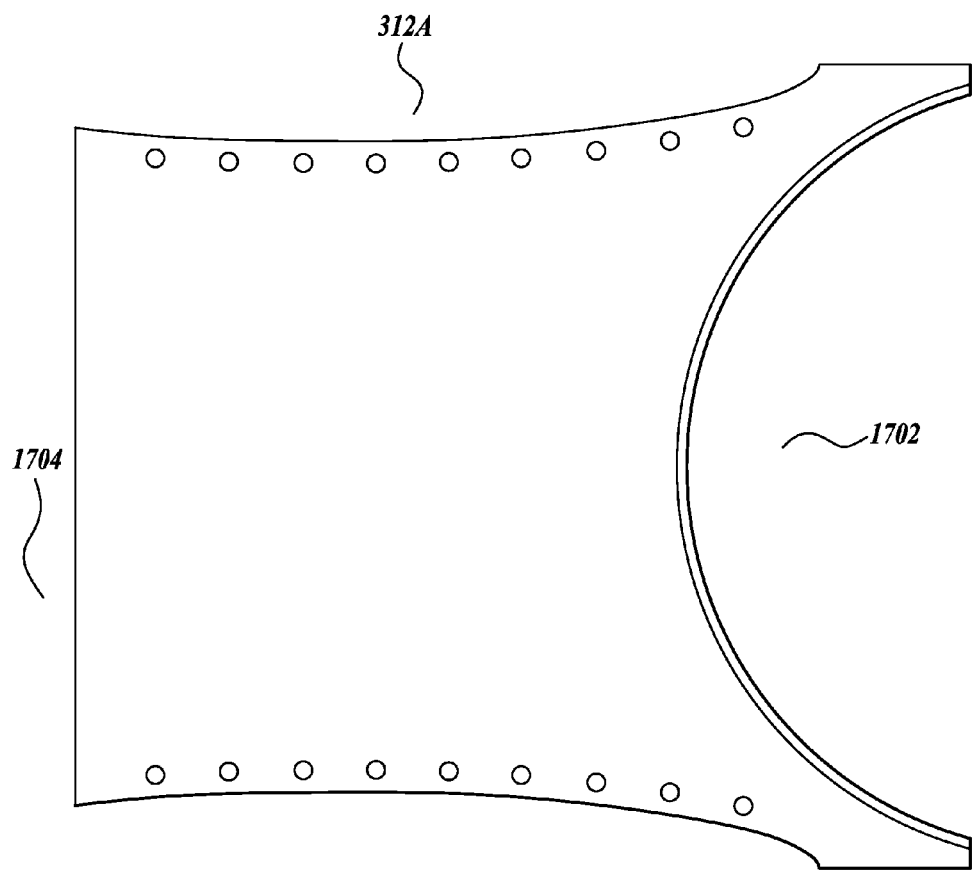
FIG. 17 is a plan view of an exemplary lower fin.
Figure 18:
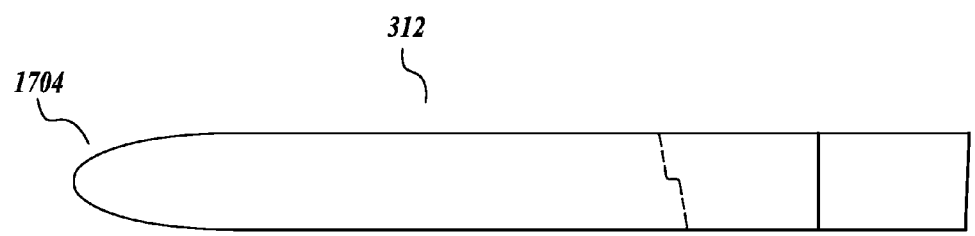
FIG. 18 is a side view of an exemplary lower fin.

FIGS. 16-18 illustrate the lower fins, such as the lower fins 312a, 312b, in greater detail. The lower fin includes a distal end 1704 and a proximal end 1702 that terminate in an arc and bifurcated to form a ledge terminus 1706. A number of holes 1708 accommodate bolts to fasten the lower fin to the lower shelves 124a, 124b, 124c, and 124d, of the columns 122a, 122b, 122c, and 122d.

In one embodiment, the lower fins are used in pairs. The pair of lower fins helps to eliminate or reduce cavitation and wave diversion. Suitably, each lower fin is formed from reinforced concrete. Each lower fin is attached to each side of two members of the quartet of columns by bolts, suitably at a corrosion-resistant angle. The pair of lower fins (such as the pair of lower fins 312a, 312b) maintains separation of the quartet of columns and stabilizes its alignment as well as supports the lower platform/bearing assembly 314. The pair of lower fins has a horizontal orientation to function as end plates for the rotor assemblies and guide the flow of ocean tides or river current toward the rotor assemblies.

Figure 19:
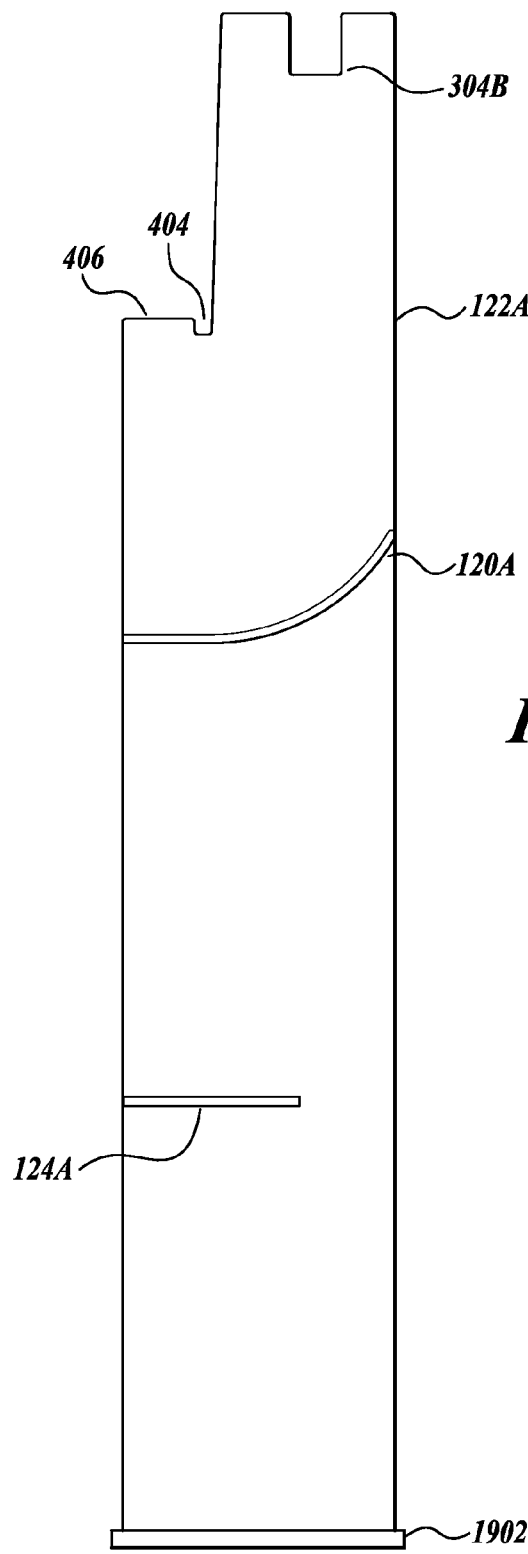
FIG. 19 is a side view of an exemplary column.

FIG. 19 illustrates a side view of a column, such as the column 122a. The top of the column 122a includes an U-shaped mortise 304b that mates with a tenon 304a protruding from a roadway span, such as the roadway span 101a. The column 122a includes a ledge 406, which is interposed by a rectangular mortise 404. The ledge 406 together with the rectangular mortise 404 of the column 122a, as well as three remaining members of the quartet of columns mounted on a base plate block, supports a nested machinery chamber 118. A shelf 120a allows an upper fin to be secured to support the upper platform/bearing assembly 310. Another shelf 124a provides support for the lower fins 312a, 312b. The column 122a includes a foot 1902 that fits in a groove on the base plate block.

Suitably the foot 1902 is grouped and bolted into a groove on the base plate block. As previously illustrated, the cross section of the columns reveals a streamlined shape depicted illustratively as an ellipse, but any suitable cross-sectional shapes can be used. One suitable cross-sectional shape includes a symmetric airfoil with trailing edge toward the center. Another suitable cross-sectional shape includes a rectangle with rounded ends. The upper portion of the column 122a is configured to support and latch in place the nested machinery chamber 118 and a roadway span. The cross section of the column 122a as illustrated previously reveals, in one embodiment, heavy wall construction of reinforced concrete and integral spars creating three spaces which can be filled with aggregate or sand.

Figure 20:
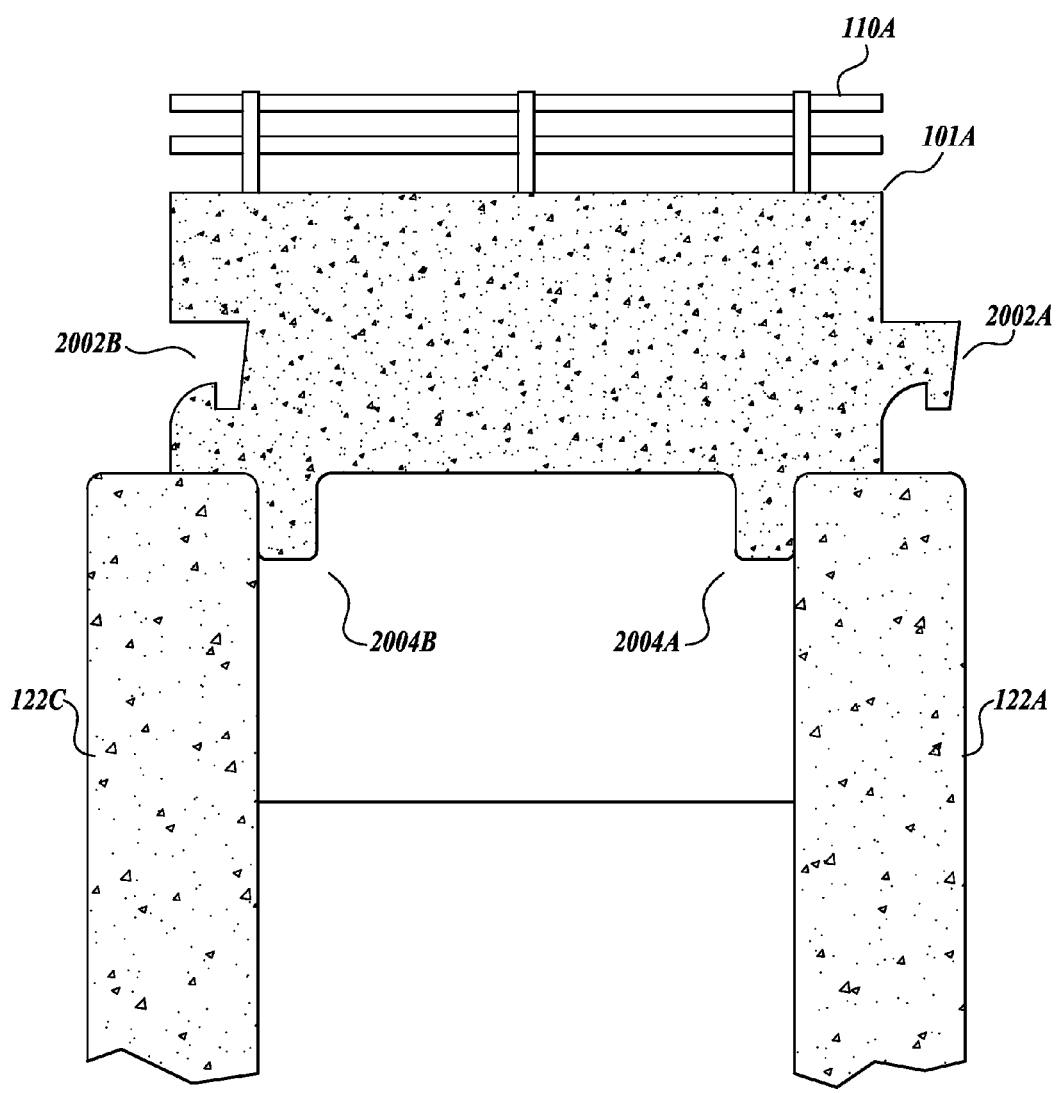
FIG. 20 is a cross-sectional, side view of a portion of an exemplary viaduct and a portion of an exemplary portion of the hydrodynamic array.

FIG. 20 illustrates a cross-sectional, side view of a portion of the viaduct 100 and the columns. More specifically, the portion of the viaduct 100 illustrated here includes the roadway span 101a, on top of which is a guardrail 110a. The roadway span 101a is interconnected with other roadway spans by mating mechanical members, such as a longitudinal male latch terminus 2002a or a void that defines a longitudinal female latch terminus 2002b, all configured to engage to fasten to each other. The roadway span 101a is further configured to include feet 2204a, 2204b which rest on top of the columns 122a, 122c.

Figure 21:
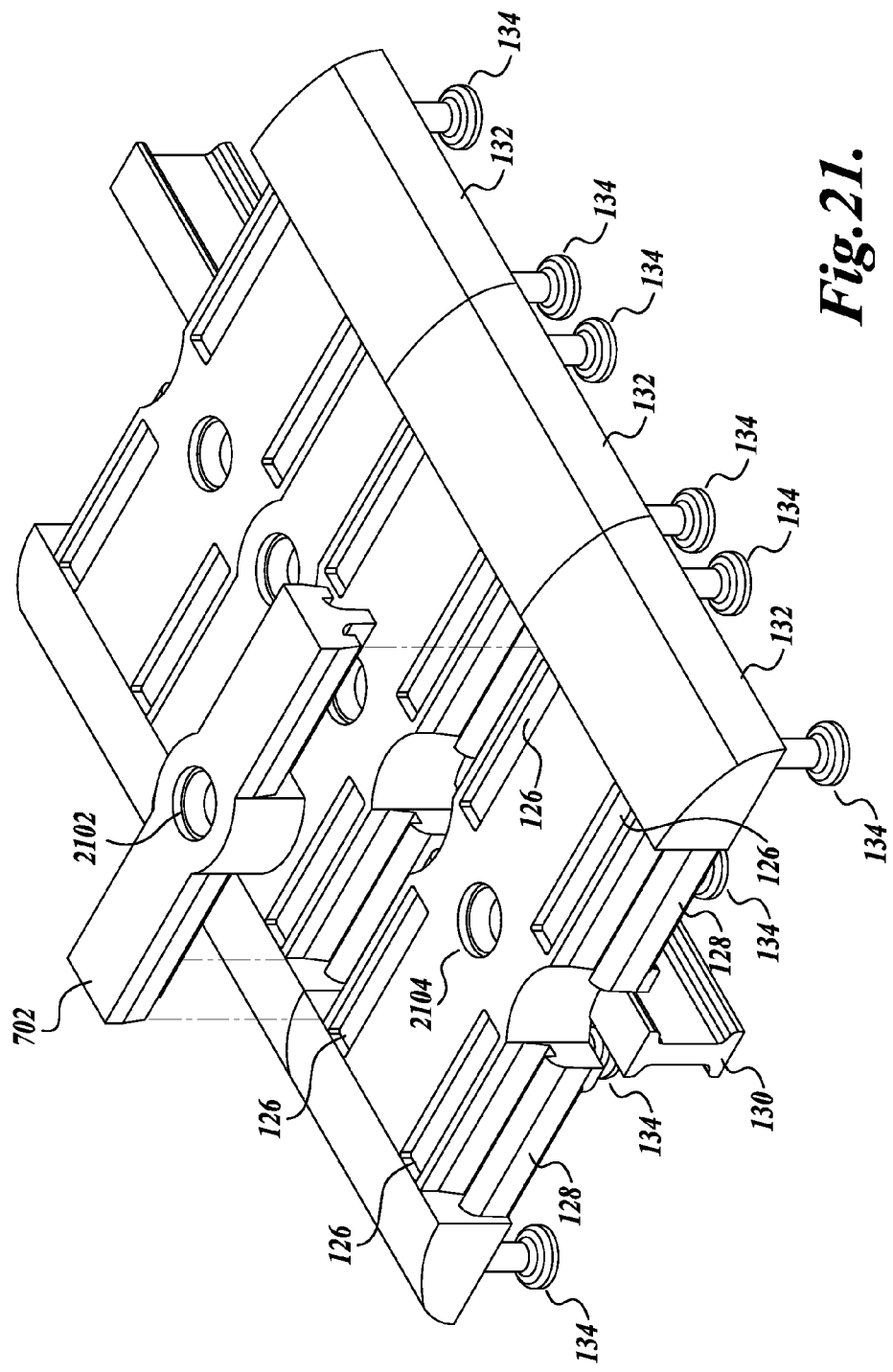
FIG. 21 is a partially exploded, isometric view of exemplary base plate blocks.
Figure 22:
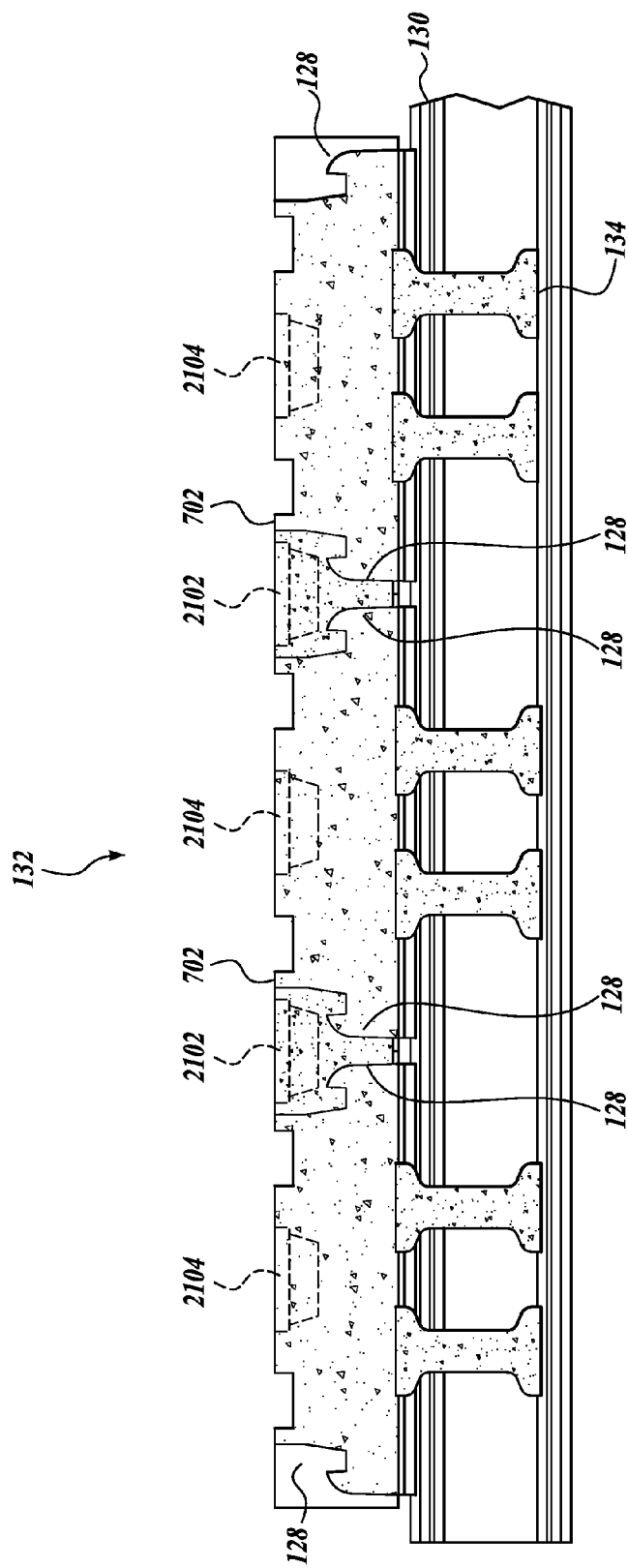
FIG. 22 is a side view of exemplary base plate blocks.

FIGS. 21, 22 illustrate base plate blocks 132 and their interrelationship in greater detail. Each base plate block 132 includes a number of feet 134 that rest on the seafloor. An I-shaped beam 130 provides further support to the base plate blocks 132 with the seafloor. The top of each base plate block 132 includes four grooves 126, each groove 126 housing a foot of a column, such as columns 122a, 122b, 122c, and 122d. At the center of the base plate block 132 is a bore 2104 that accommodates a bottom platform/bearing assembly 2600. On either side of the base plate block 132 are latch termini 128 configured to abut with the latch termini of adjacent base plate blocks 132. A T-shaped latch member 702 engages the latch termini 128 of adjacent base plate blocks 132 to mate and bring adjacent blocks 132 into mutual fastening. On top, at the center of the T-shaped latch member is a bore 2102 that preferably shares similar dimensions of the bore 2104 to accommodate the bottom platform/bearing assembly 2600.

The columns and the base plate blocks of various embodiments of the present subject matter provide permutations to support a stable installation of seabed support structures depending on the type of bottom composition, depth of the water, size of the largest waves of the locality, type of supported local construction, seismic activity, rotor drag for the hydrodynamic array, and topside loading if road or rail traffic is involved. In one embodiment, a base plate block supports a quartet of columns whose center houses the upper platform/bearing assembly, the center platform/bearing assembly, and the bottom platform/bearing assembly.

Figure 23:
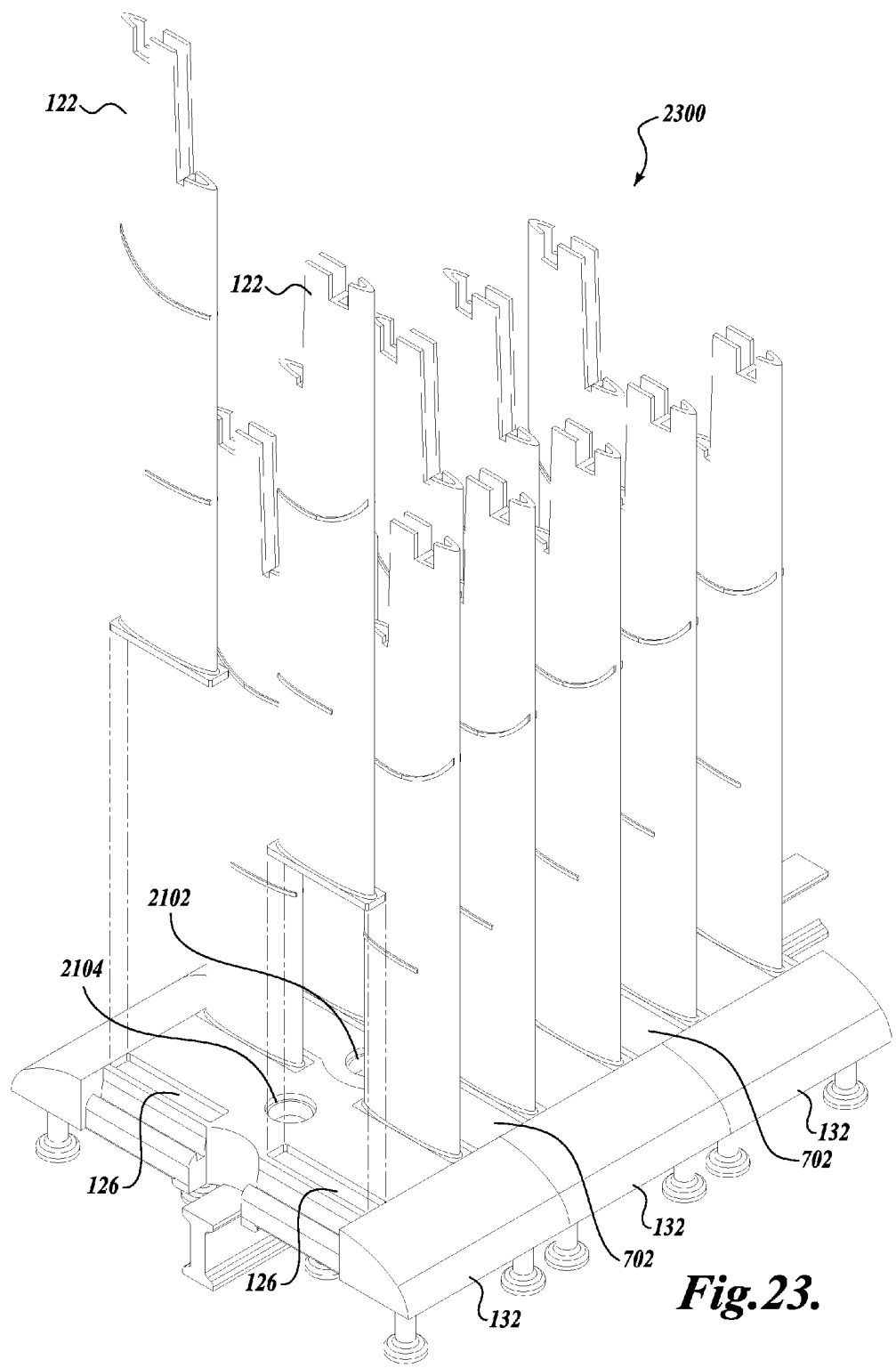
FIG. 23 is a partially exploded, isometric view of a portion of exemplary columns and exemplary base plate blocks.
Figure 24:
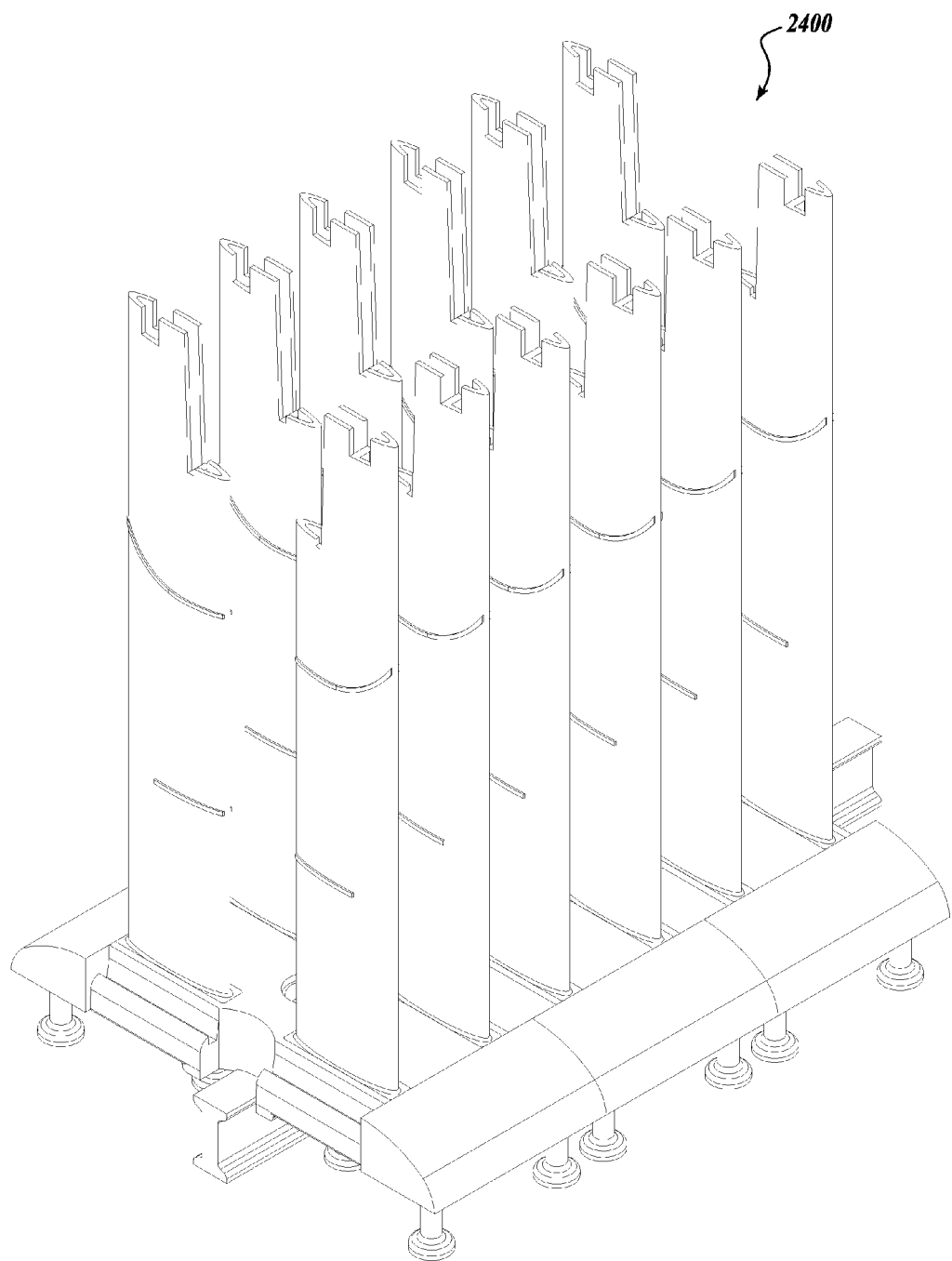
FIG. 24 is an assembled, isometric view of a portion of exemplary columns and exemplary base plate blocks.

FIG. 23 illustrates a partially exploded, isometric view of the interrelationship between the columns and the base plate blocks 132. Each base plate block 132 is mutually fastened to an adjacent base plate block 132 via one or more T-shaped latch members 702. Each base plate block 132 includes four grooves 126, each groove housing a foot of a column. FIG. 24 illustrates an assembled, isometric view of the interrelationship between the columns 122 and the base plate blocks 132.

Figure 25:
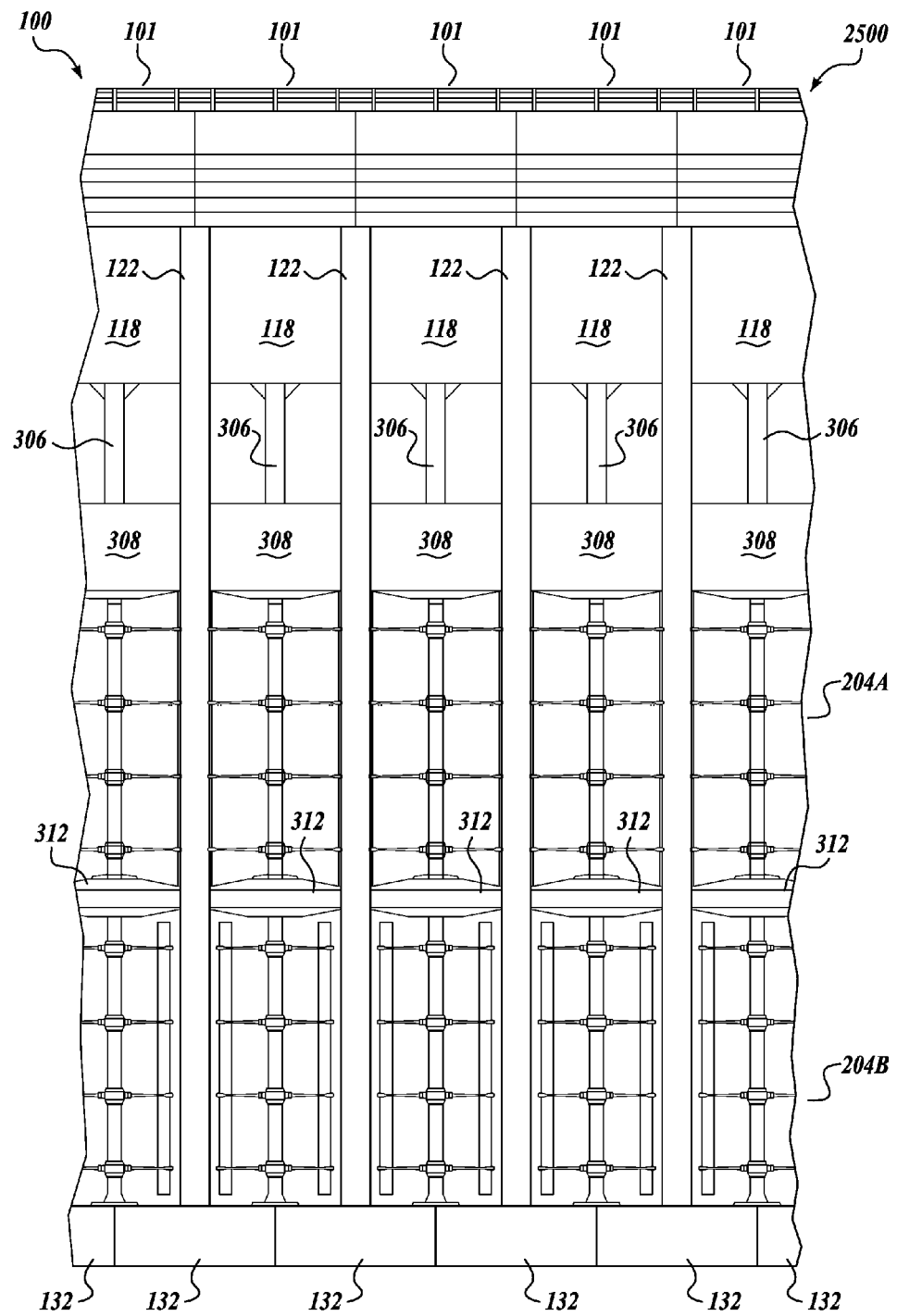
FIG. 25 is a side view of an exemplary viaduct on top of an exemplary hydrodynamic array.

FIG. 25 illustrates a side view of the viaduct and its interrelationship with the hydrodynamic array. The viaduct 100 is shown to include multiple roadway spans 101 that are interconnected with one another while resting on top of columns 122. Between each column 122, from a side view, are the nested machinery chambers 118. Protruding below each nested machinery chamber 118 is the torque drive shaft 306 that is partially hidden by the upper fins 308. Below the upper fins 308 are one or more upper rotor assemblies 204a. Interposed between the upper rotor assemblies 204a and the lower rotor assemblies 204b are one or more lower fins 312. The lower rotor assemblies 204b and the columns 122 rest upon one or more base plate blocks 132.

Figure 26:
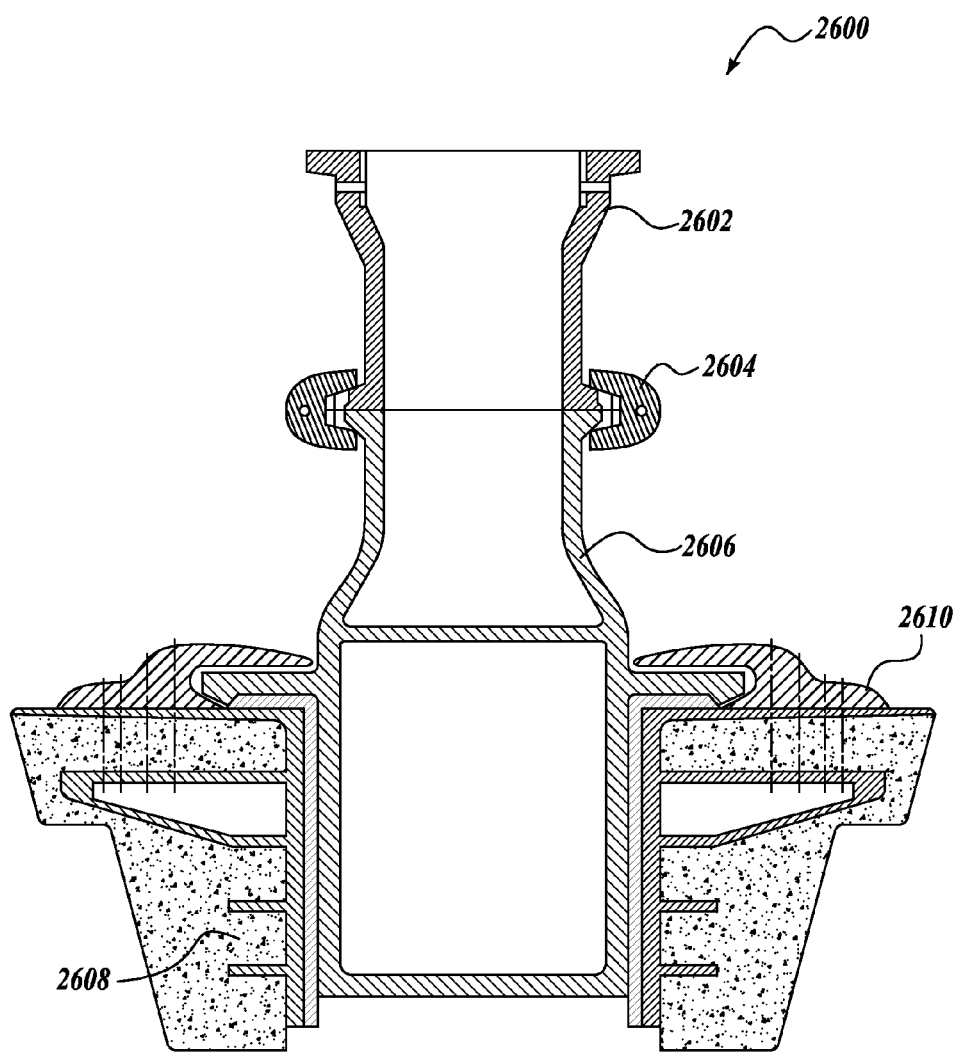
FIG. 26 is a cross-sectional, side view of an exemplary bottom platform/bearing assembly.

FIG. 26 illustrates a cross-sectional, side view of the bottom platform/bearing assemblies 2600. A shaft segment 2602 is coupled to a bearing cylinder 2606 via a C-shaped clamp 2604. The bearing cylinder 2606 is retained to the bottom platform/bearing assembly 2600 by a cover plate 2610 that holds down the bearing cylinder 2606. The bearing cylinder 2606 engages the bottom platform/bearing assemblies by stave bearings 2608.

In one embodiment, the bearing assembly portion of the lower platform/bearing assembly 2600 is formed from a thick-walled cylinder with disc and ribs that are embedded in the lower platform/bearing assembly 2600. The interiors of the cylinders are machined to support stave bearing elements 2608, suitably made from heavy-duty composite water-lubricated structures. Suitably, the stave bearing elements are kept from overheating although they can function under extreme abuse, such as from high fluctuating loads, grit and other contaminants, misalignment, and water flow blockage. It is suitable to circulate seawater through the stave bearing elements 2608 to reduce overheating.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for producing electricity hydrodynamically, comprising:
   a viaduct through which vehicles traverse, the viaduct being formed from multiple pairs of roadway spans, each roadway span including two feet and two tenons, a first roadway span of a first pair of roadway spans being supported by two columns from a first quartet of columns, the two feet of the first roadway span transversely resting on the top of the two columns while the tenons of the first roadway span mate with U-shape mortises of the two columns; and
   a hydrodynamic array configured to support the viaduct and further configured to generate electricity from the motion of ocean tides or river currents and forces acting on the hydrodynamic array, which is immersed in the ocean tides or river currents, and which is in motion relative to the ocean tides or river currents.

2. The system of claim 1, wherein each roadway span including includes guardrails, safety wall, side drain, crane rails, equipment rails, manhole cover, manhole, and a triangular cavity configured to carry power cables.

3. The system of claim 1, wherein each roadway span including a latitudinal latch terminus, a longitudinal male latch terminus, and a longitudinal female latch terminus.

4. The system of claim 3, wherein the hydrodynamic array is formed from multiple hydrodynamic elements, a first hydrodynamic element including the first quartet of columns, which supports the first pair of roadway spans latitudinally.

5. The system of claim 4, wherein each column of the first quartet of columns includes a top with the U-shaped mortise and a ledge connected to the column by a rectangular mortise.

6. The system of claim 5, wherein the two columns of the first quartet of columns together with two additional columns form a second quartet of columns, which supports a second pair of roadway spans latitudinally.

7. The system of claim 6, wherein a second roadway span of the second pair of roadway spans is supported by two columns from the second quartet of columns, the longitudinal male latch terminus of the second roadway span mating with the longitudinal female latch terminus of the first roadway span.

8. The system of claim 4, wherein the hydrodynamic element includes a nested machinery chamber, the top of the nested machinery chamber defining a median span.

9. The system of claim 8, wherein the median span includes first and second latitudinal latch termini, the first latitudinal latch terminus mating with the latitudinal latch terminus of a roadway span from the first pair of roadway spans, and the second latitudinal latch terminus mating with the latitudinal latch terminus of the remaining roadway span of the first pair of roadway spans.

10. The system of claim 9, wherein the nested machinery chamber houses a generator chamber, which contains a generator for translating mechanical energy into electrical energy, the generator being coupled to a torque shaft.

11. The system of claim 10, wherein the nested machinery chamber includes a top defining as a median span, which includes a machinery hatch and a manhole cover to provide access to the nested machinery chamber.

12. The system of claim 10, wherein the torque shaft coaxially engages an upper platform/bearing assembly that is substantially rectangular in shape and has two ends, the two ends mating with ledge termini of a pair of upper fins whose upward curving distal ends guide the flow of ocean tides or river current under the pair of upper fins.

13. The system of claim 12, wherein the torque shaft coaxially engages an upper rotor assembly that is positioned below the upper platform/bearing assembly and the pair of upper fins.

14. The system of claim 13, wherein the torque shaft coaxially engages a center platform/bearing assembly that is substantially circular in shape, which mates with ledge termini formed from two arcs at the proximal ends of a pair of lower fins, which are substantially horizontal in orientation.

15. The system of claim 14, wherein the torque shaft coaxially engages a lower rotor assembly that is positioned below the center platform/bearing assembly and the pair of lower fins.

16. The system of claim 15, wherein the torque shaft terminates in a lower platform/bearing assembly that sits in a bore of a base plate block or in a bore of a T-shaped latch member.

17. The system of claim 16, wherein the base plate block has four grooves to accommodate the feet of the first quartet of columns, the sides of the base plate block including latch termini.

18. The system of claim 17, wherein the base plate block is positioned adjacent to another base plate block and are both mutually fastened to each other by the T-shaped latch member.

19. The system of claim 4, wherein a cross section of a column is a shape selected from a group consisting of an ellipsoid, symmetric airfoil with trailing edge toward the center and a rectangle with rounded ends.

\* \* \* \* \*